(12) United States Patent
Tatsuta et al.

(10) Patent No.: US 6,408,106 B1
(45) Date of Patent: Jun. 18, 2002

(54) INFORMATION READING SYSTEM

(75) Inventors: Seiji Tatsuta, Hino; Akira Matsui, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/360,260

(22) Filed: Jul. 26, 1999

(30) Foreign Application Priority Data

Jul. 27, 1998 (JP) ............................................ 10-210737

(51) Int. Cl.⁷ ................................................. G06K 9/36
(52) U.S. Cl. ...................................... 382/287; 382/305
(58) Field of Search ................................. 382/173, 195, 382/203, 270, 287, 312, 317, 305, 321, 309; 341/50; 358/488, 526, 528; 386/113; 707/6; 369/59; 714/752

(56) References Cited

U.S. PATENT DOCUMENTS

| | | | | |
|---|---|---|---|---|
| 5,764,611 A | * | 6/1998 | Watanabe | 369/59 |
| 5,767,494 A | * | 6/1998 | Matsueda et al. | 235/454 |
| 5,825,309 A | * | 10/1998 | Matsui et al. | 341/50 |
| 5,835,629 A | | 11/1998 | Seo | 382/173 |
| 5,896,403 A | | 4/1999 | Nagasaki et al. | 714/752 |
| 6,058,392 A | * | 5/2000 | Sampson et al. | 707/6 |
| 6,058,498 A | * | 5/2000 | Nagasaki et al. | 714/752 |
| 6,219,460 B1 | * | 4/2001 | Tatsuta | 382/270 |

* cited by examiner

Primary Examiner—Leo Boudreau
Assistant Examiner—Kanji Patel
(74) Attorney, Agent, or Firm—Frishauf, Holtz, Goodman & Chick, P.C.

(57) ABSTRACT

A code comprises data patterns recorded according to a piece of information and markers arranged at predetermined respective positions relative to the data, patterns and used to determine the position for reading each of the data patterns. The data patterns and the markers are optically readably recorded in different modes. An image memory section stores the optically readable image of the code picked up by an imaging section. An attribute determining section determines the attribute of the image stored in the image memory section on the basis of a unit of a plurality of adjacently arranged pixels selected as a function of the size of the markers and a marker detecting section detects the markers on the basis of the attribute determined by the attribute determining section. A data reading section determines the position for reading the data pattern on the basis of the detected positions of the markers and actually read the data.

17 Claims, 14 Drawing Sheets

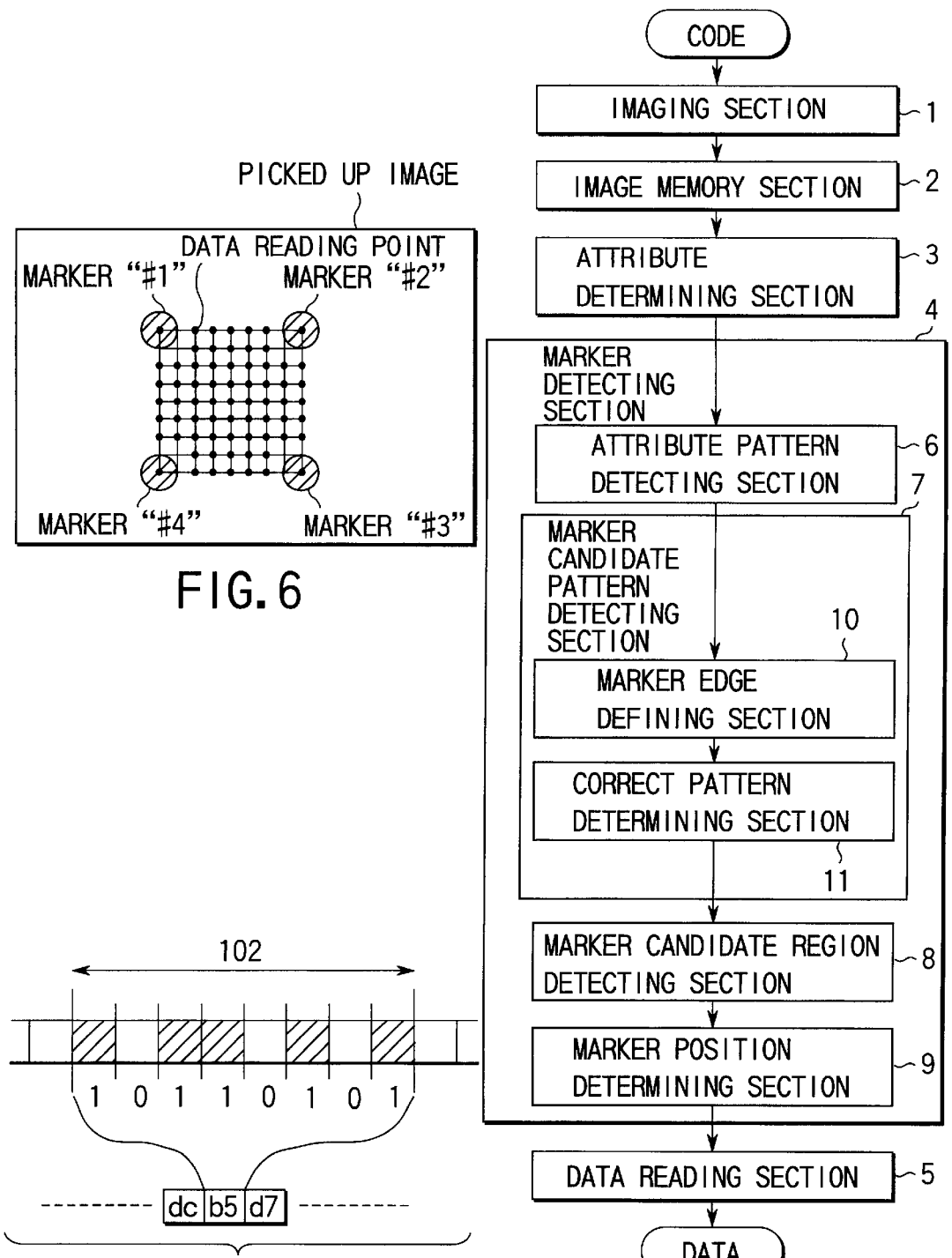

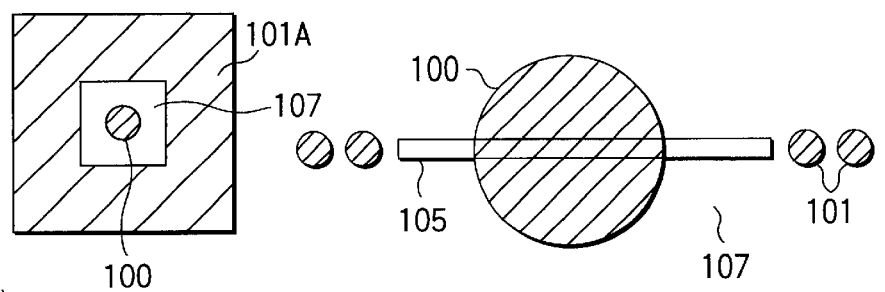

FIG. 9

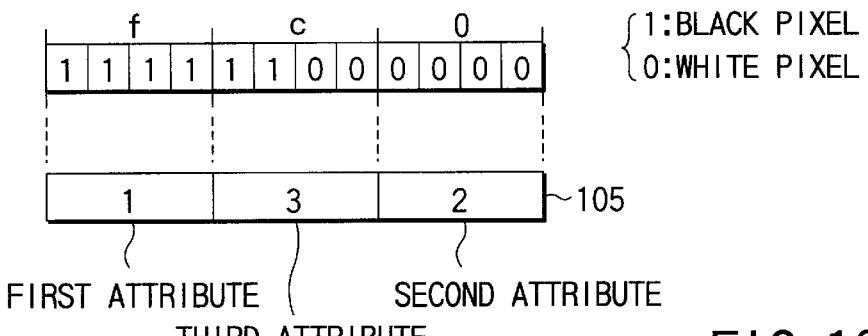

FIG. 10

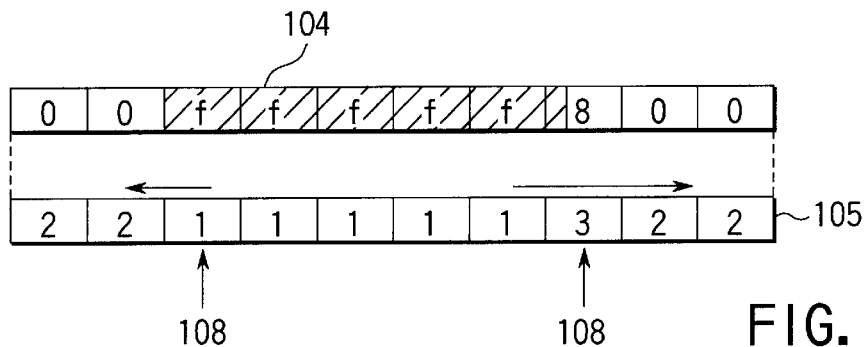

FIG. 11

ATTRIBUTE TRANSITION PATTERN AND
DEFINITION OF FIRST AND SECOND EDGES

| | ATTRIBUTE TRANSITION PATTERN | DEFINITION OF EDGES | REMARKS |
|---|---|---|---|
| A | 1- - -①→2 | DEFINITION OF FIRST AND SECOND EDGES | FIRST EDGES AGREE WITH SECOND EDGES |
| B | 1- - -1- - -→3→1 | NO EDGE DEFINITION | TO BE REGARDED AS A WHITE BLANKED AREA |
| C | 1- - -1- - -→③→2 | DEFINITION OF FIRST AND SECOND EDGES | FIRST EDGES AGREE WITH SECOND EDGES |
| D | 1- - -1- - -→③→3 | DEFINITION OF FIRST EDGES | TO BE REGARDED AS AN EDGE+BLACK STAIN |

EDGE ARE DEFINED FOR THE ENCIRCLED PIXELS.
THE EDGE CLOSER TO THE MARKER IS EFFECTIVE
IF MORE THAN ONE IDENTICAL EDGES EXIST

FIG. 14

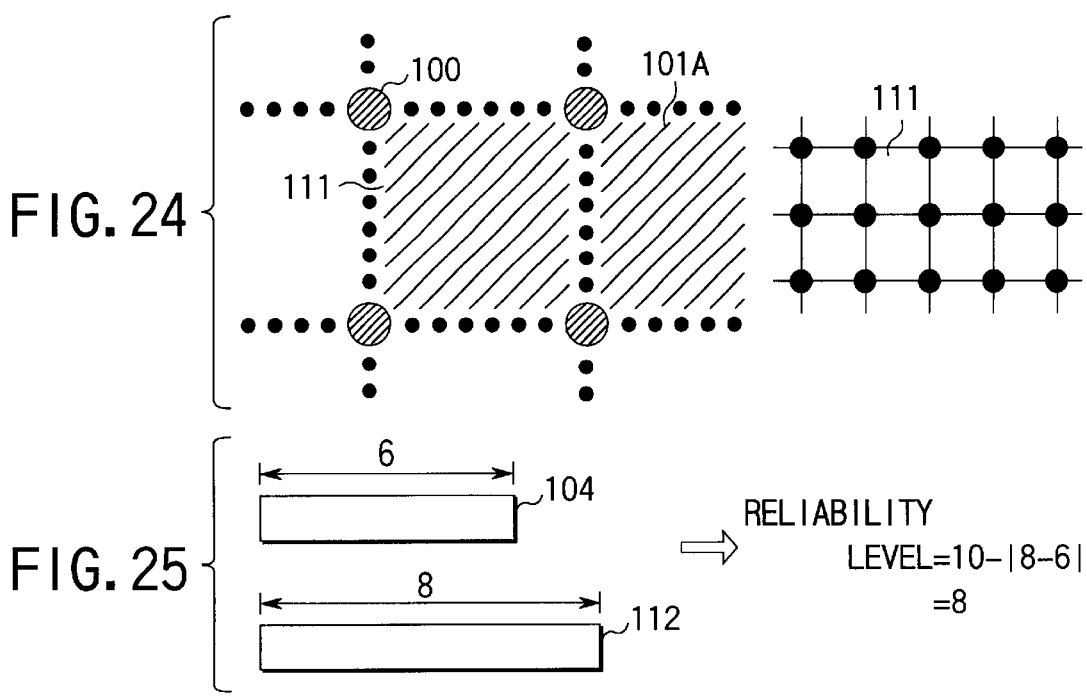
FIG. 24
FIG. 25
FIG. 26
THE VALUE WITHIN A MARKER INDICATES THE MARKER RELIABILITY
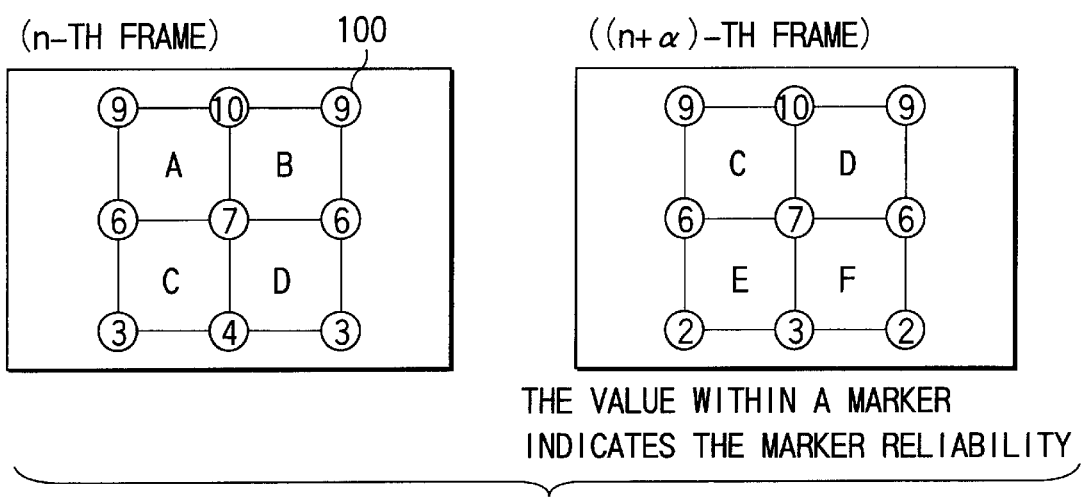
FIG. 27

INFORMATION READING SYSTEM

BACKGROUND OF THE INVENTION

This invention relates to an information reading system adapted to read an optically readable code recorded on a recording medium in order to reproduce the original information, the code including data patterns representing a piece of information and markers to be used for determining the position for reading each of the data patterns.

U.S. Pat. No. 5,835,629 describes an image processing apparatus adapted to extract the area of a specific object (marker) defined by a predetermined contour from an image containing markers.

More specifically, the disclosed image processing apparatus raster scans an input of binary image data, extracts runs (hereinafter,referred to as streaks) constituting part of each of the markers and located within a predetermined area and defines a circumscribed tetragon for the extracted set of streaks to extract the area of each of the marker. This apparatus provides an advantage that markers. can be easily detected with a simple processing operation because the area of a marker can be extracted simply by using data on the size of the marker or the run length.

While the proposed apparatus is advantageous in that it can detects the area of a marker by using only the run length, it has to process a large volume of data and hence is not adapted to deal with software because the input binary image data has to be scanned on a pixel by pixel basis to extract black runs. Additionally, it is highly sensitive and detects noises such as stains and/or scars that are found in the input binary image data but should not be detected so that it requires particular attention to avoid detection of wrong runs due to stains and occurrences of missing runs due to scars.

In an attempt to avoid the above identified problems, the cited U.S. Patent also proposes an apparatus adapted to perform an operation of combination/separation/substitution on the set of streaks that has been detected depending on the state of contiguity of a newly extracted streak and also an apparatus adapted to cancel the detection of a marker if the area of the extracted marker exceeds a predetermined size. Then, any erroneous detection of runs due to stains and any occurrence of missing runs due to scars can be corrected and the area of a marker can be accurately extracted.

However, an apparatus according to the cited U.S. Patent is not satisfactory for extracting the area of a marker at high speed while avoiding the influence of stains and scars. For example, it takes too much time for determining the validity of each streak because all the input binary image data has to be processed on a pixel by pixel basis. Additionally, wrong runs that resemble streaks of a marker-can appear in a peripheral area of the image due to shading and/or other phenomena to give rise to a risk of detecting wrong streaks.

In short, an apparatus according to cited U.S. Patent is not satisfactory in terms of high speed extraction of a marker and elimination of disappeared markers and wrong markers and hence there is a demand for an improved information reading system.

BRIEF SUMMARY OF THE INVENTION

Therefore, it is the object of the present invention to provide an information reading system adapted to carry out a processing operation of extracting a marker at high speed. and prevent missing data that have to be read out from taking place due to disappearance of a marker or appearance of a wrong marker.

According to an aspect of the present invention, there is provided an information reading system adapted to optically read a code optically readably recorded on an information recording medium and including data patterns recorded according to a given piece of information and markers of a predetermined size arranged with predetermined positional relationships relative to the data patterns and provided for use in determining the position for reading each of the data patterns, the markers being optically identifiably recorded in a mode different from the mode of recording the data pattern, the information reading system comprising:
an imaging section for imaging the code from the information recording medium;
an image memory section for storing at least a partial region of the image picked up by the imaging section;
an attribute determining section for determining the attributes of a unit of a predetermined number of adjacently located pixels, the number of pixels being determined on the basis of the size of the markers, in order to discriminate the markers from the data patterns in the image stored in the image memory section;
a marker detecting section for detecting the markers on the basis of the attributes determined by the attribute determining section; and
a data reading section for determining the positions for reading the data patterns on the basis of the positions of the markers detected by the marker detecting section and reading the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a schematic view of a code having a format where markers and data patterns are arranged on a same and single grid, illustrating the operation of the data reading section.

FIG. 7 is a schematic illustration of a processing unit for determining the attribute that can be used by the image memory section in order to store an image data of consecutive eight pixels and also by the attribute determining section in order to determine the attribute of eight pixels.

FIG. 8 is a schematic block diagram of a second embodiment of information reading system according to the invention.

FIG. 9 is a schematic view of a code containing a blank region arranged respectively between a marker and a data pattern.

FIG. 10 is a schematic illustration of the method used in the second embodiment to determine the first through third attributes.

FIG. 11 is a schematic view of a marker candidate pattern that is determined as valid.

FIG. 14 is a schematic illustration describing attribute transition patterns and edge defining rules.

FIG. 24 is a schematic view of a code to be divided into blocks, each having markers arranged respective at the four corners thereof.

FIG. 25 is a schematic illustration of an operation of determining the reliability of the marker reliability determining section.

FIG. 26 is a schematic illustration of the reliability and the data of the n-th frame and those of the (n+α)-th frame.

FIG. 27 is a schematic illustration of the relationship between the data and the reliability of the n-th frame and the relationship between the data and the reliability of the (n+α)-th frame.

DETAILED DESCRIPTION OF THE INVENTION

Now, the present invention will be described in greater detail by referring to the accompanying drawings that illustrate preferred embodiments of the invention.

1st Embodiment

Figure 1:
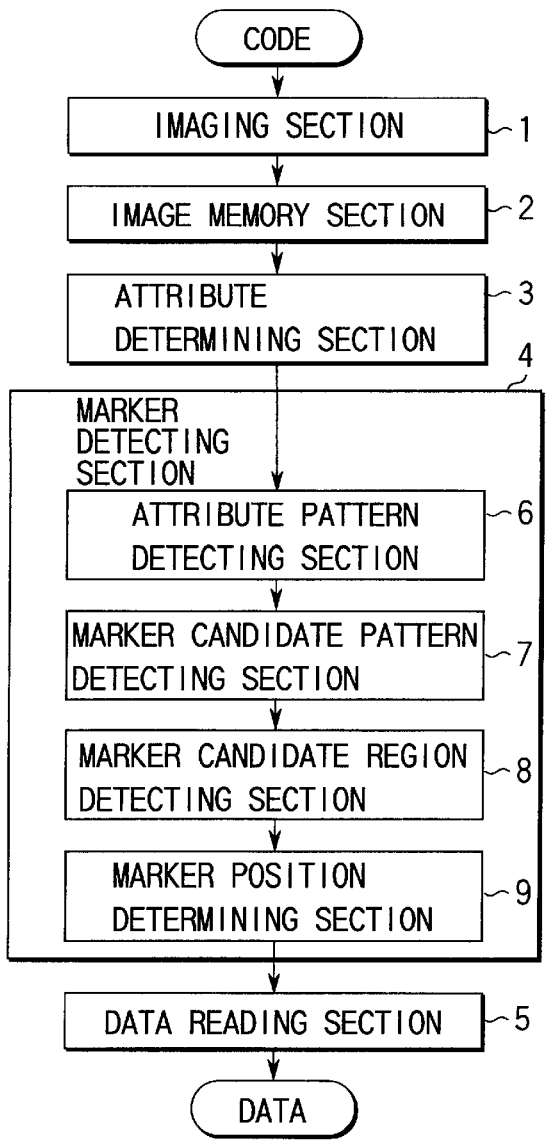
FIG. 1 is a schematic block diagram of a first embodiment of information reading system according to the invention.

FIG. 1 is a schematic block diagram of a first embodiment of information reading system according to the invention. Referring to FIG. 1, the information reading system comprises an imaging section 1, an image memory section 2, an attribute determining section 3, a marker detecting section 4 and a data reading section 5. The marker detecting section 4 includes an attribute pattern detecting section 6, a marker candidate pattern detecting section 7, a marker candidate region detecting section 8 and a marker position determining section 9.

Figure 2A:
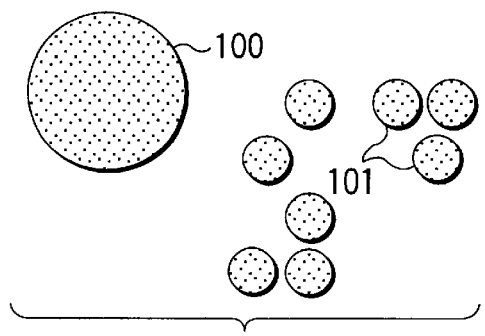
FIGS. 2A and 2B schematically illustrate examples of optically readable codes that can be used for the purpose of the invention.
Figure 2B:
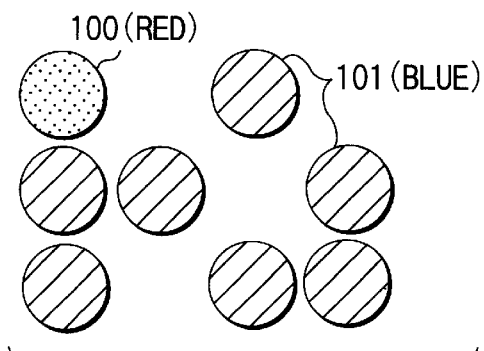

FIG. 2A shows an optically readable code to be read by the information reading system. In FIG. 2A, a ,code contains one or more than one markers 100 and data patterns 101 having different respective sizes. In FIG. 2B, a code contains markers 100 and data patterns shown in different respective colors. In either case, the markers and the data patterns can be optically identified.

Now, the operation of the information reading system having the above configuration will be described below.

Figure 3A:
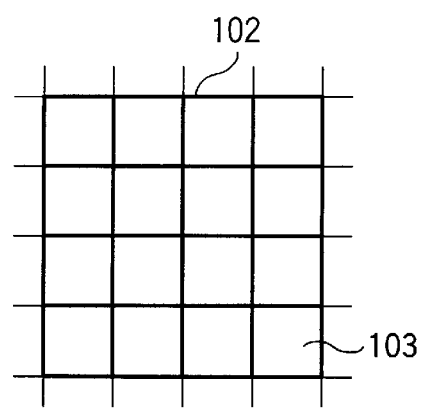
FIGS. 3A and 3B schematically illustrate examples of processing units that can be used for determining the attribute of a marker.
Figure 3B:
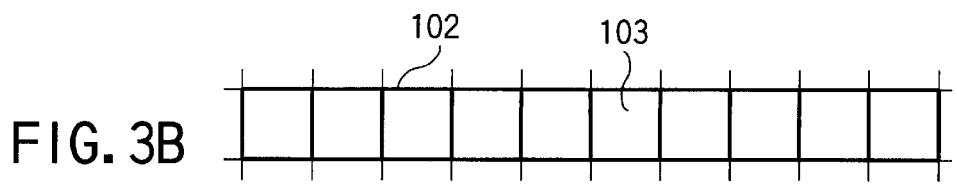

Firstly, the imaging section 1 reads out a code by means of an imaging device such as a CCD and converts it into an electric signal, which is then stored in the image memory section 2. Then, the attribute determining section 3 determines the attribute of the image stored in the image memory section 2 on the basis of a unit of a predetermined number,of consecutively arranged pixels as shown in FIG. 3A or 3B. In FIG. 3A, 4×4 pixels 103 are used as a processing unit 102 for determining the attribute. In FIG. 3B, on the other hand, 1×10 pixels 103 are used as a processing unit 102 for determining the attribute. However, a unit of pixels that can be used for the information reading system of this embodiment is not limited to those of FIGS. 3A and 3B and may comprise any desired number of consecutively arranged pixels 103.

Figure 4A:
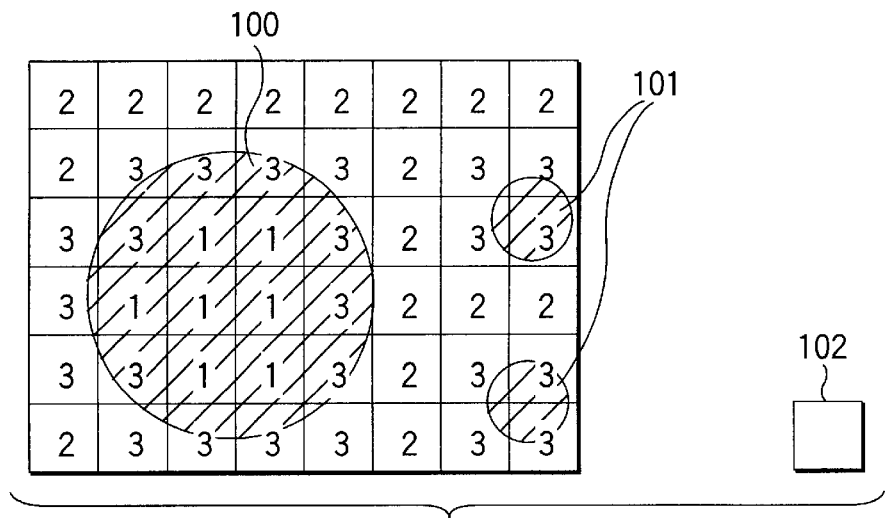
FIGS. 4A and 4B schematically illustrate the results of operations of determining the attribute of a marker.
Figure 4B:
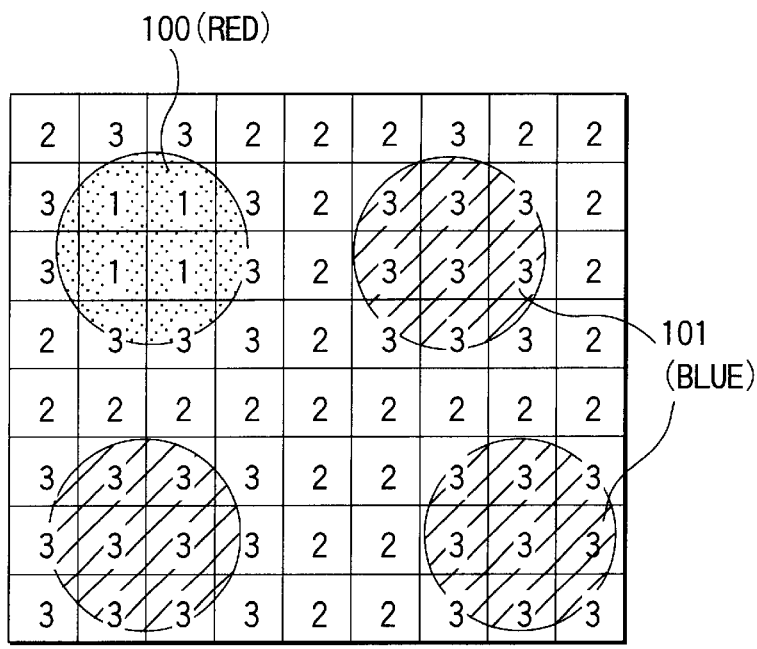

Referring to FIGS. 4A and 4B, for determining the attribute of a marker, the first attribute that is the attribute of the inside of a marker 100 (as indicated by "1" in FIGS. 4A and 4B), a second attribute that is the attribute of the outside of the marker 100 (as indicated by "2" in FIGS. 4A and 4B) and a third attribute that is the attribute other than the first and second attributes (as indicated by "3" in FIGS. 4A and 4B) will be used. Note that the processing unit 102 to be used for determining the attribute here is a square containing n×n pixels as shown in FIG. 3A.

More specifically, the imaging section 1 picks up an image of the code as shown in FIG. 2A and the image memory section 2 reduces the image into data of the binary system and stores black pixels as so many "1s" and white pixels as so many "0s". Then, the attribute determining section 3 determines the attribute in a manner as shown in FIG. 3A. If all the pixels of the processing unit 102 for determining the attribute are "1s", it is determined as that of the first attribute indicating the inside of the,.marker 100. If, on the other hand, all the pixels of the processing unit 102 for determining the attribute are "0s", it is determined as that of the second attribute indicating the outside of the marker 100 in a neighboring area thereof. If, however, the pixels are a mixture of two binary values, the unit is determined as that of the third attribute. FIG. 4A shows the result of the operation.

FIG. 4B shows the result of an operation of determining the attribute of a code where markers are indicated in red and data patterns are indicated in blue. If 70% of the pixels 103 of a processing unit 102 for determining the attribute is shown in red, it will be determined to be of the first attribute. If, on the other hand, the pixels 103 of a processing unit 102 for determining the attribute are neither red nor blue, it will be determined to be of the second attribute. If, however, the processing unit 102 is neither of the first attribute nor of the second attribute, then it will be determined to be of the third attribute.

In this way, the attribute determining section 3 collectively determines the attribute of pixels not on a pixel by pixel basis but on a unit by unit basis, each unit being formed by a plurality of consecutively arranged pixels, so that the number of operations of determining the attribute can be reduced significantly to realize a high speed operation.

The size of processing unit 102 for determining the attribute is determined by the attribute determining section 3 by taking the accuracy of detecting markers and the processing speed into consideration. If a small processing unit 102 is selected for determining the attribute, the accuracy of detecting markers will be increased but the necessary processing time will also increase because the number of determining operations will be increased when a small processing unit is selected. If, on the other hand, a large processing unit 102 is selected for determining the attribute, the number of determining operations will be decreased to raise the processing speed but markers 100 may not be detected particularly when the size of processing unit 102 is increased to become equal to or greater than the diameter of a marker. Therefore, it is desirable that a processing unit 102 for determining the attribute is determined within a range that provides a sufficient resolution for detecting markers 100 with their characteristic trait by taking the processing speed into consideration. When a marker 100 and a data pattern 101 are discriminated by size, a processing unit 102 for determining the attribute may be so selected that the characteristic trait of markers. will not be detected within an picked up image not including any marker or the data patterns 101 may be so modulated as to prevent a pattern that resembles a marker from being produced.

By appropriately selecting an appropriate size for the processing unit 102 for determining the attribute, taking the size of a data pattern 101 and that of a marker 100 into consideration, markers 100 can be detected at high speed from an image randomly containing both data patterns 101 and one or more than one markers 100 differentiated from the data pattern 101 in terms of size.

Then, the attribute pattern detecting section 6 detects the pattern of appearance of the attribute determined by the attribute determining section 3 as attribute pattern. Thereafter, the marker candidate pattern detecting section 7 detects the attribute pattern detected by the attribute pattern detecting section 6 as a marker candidate pattern 104 when it shows the characteristic trait of markers to be detected.

Figure 5:
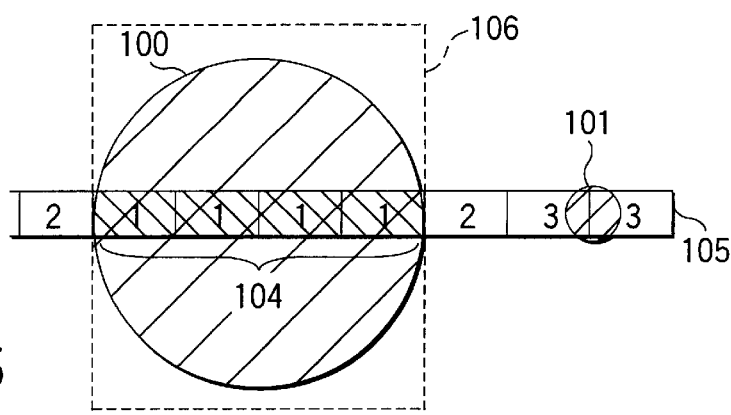
FIG. 5 is a schematic illustration of an operation of the marker candidate pattern detecting section for detecting a marker candidate pattern and that of the marker candidate region detecting section for detecting a marker candidate region.

For example, when an attribute pattern 105 containing a set of a predetermined number of consecutively arranged first attributes to indicate the inside of a marker appears as shown in FIG. 5, it will be detected as a marker candidate pattern 104. Then, only the consecutiveness of the first attributes of the set indicating the state of the inside of a marker needs to draw attention for the processing operation so that the overall operation of marker detection is simplified to allow the operation to be conducted at high speed.

Then, the marker candidate region detecting section 8 detects a region that contains at least a marker candidate pattern 104 detected by the marker candidate pattern detecting section 7 and is sufficiently large for containing a marker 100 as a marker candidate region 106. For example, a marker candidate region 106 may be a square as shown in FIG. 5 where the point of intersection of the two diagonals agree with the center of the marker candidate pattern 104 and each side has a length equal to the diameter of a marker.

Subsequently, the marker position determining section 9 determines the position of the marker 100 contained within the marker candidate region 106 detected by the marker candidate region detecting section 8. Any appropriate known technique may be used for determining the position of a marker. For example, the point of intersection of a circumscribed tetragon of the marker 100 or the centroid of the marker 100 may be used to indicate the marker position.

The data reading section 5 determines the data pattern reading points on the basis of the marker position determined by the marker position determining section 9 and starts reading the data patterns 101. For example, if the code has a format of arranging markers 100 and data patterns 101 to show a grid, the data patterns 101 of a grid defined by four markers, marker #1 through #4, that are determined by the marker position determining section 9 as shown in FIG. 6 will be read on a crossing by crossing basis.

Thus, with the above described embodiment of information reading system, the attribute is determined on a unit by unit basis, each unit containing a plurality of pixels, the size of which is determined as a function of a marker 100. Therefore, it allows a high speed processing if compared with any conventional techniques of detecting runs on a pixel by pixel basis along the raster direction to detect markers 100.

While data may be read out from the image memory section 2 either in a serial transfer mode or in a parallel transfer mode in this embodiment, the use of a parallel transfer mode for reading out data from the image memory section 2 can allow a higher processing speed if the unit for storing the image and the unit for determining the attribute are selected on the basis of the unit to be used for data transfer.

For instance, the image memory section 2 may binarize the picked up image into values of the binary system and produce a pack image data for eight consecutive pixels, which it stores in it as shown in FIG. 7. Then, the attribute determining section 3 may determines the attribute on the basis of a unit of eight pixels. With such an arrangement, the processing unit 102 for determining the attribute and the unit to be used by the image memory section 2 for storing data agree with each other to make it possible to access the image memory section 2 for determining the attribute efficiently and further reduce the processing time.

2nd Embodiment

Now, a second embodiment of the invention will be described.

Referring to FIG. 8, this embodiment of information reading system comprises, like the above described first embodiment, an imaging section 1, an image memory 2, an attribute determining section 3, a marker detecting section 4 and a data reading section 5 and the marker detecting section 4 includes an attribute pattern detecting section 6, a marker candidate pattern detecting section 7, a marker candidate region detecting section 8 and a marker position determining section 9. In this embodiment, the marker candidate pattern detecting section 7 includes a marker edge defining section 10 and a correct pattern determining section 11.

Thus, this embodiment of information reading system is identical with the above described first embodiment except the marker candidate pattern detecting section 7 and hence the components other than the marker candidate pattern detecting section 7 will not be described here any further.

The embodiment operates in a manner as described below.

The marker edge defining section 10 detects a predetermined pattern having a characteristic trait of the marker edges from the attribute pattern 105 detected by the attribute pattern detecting section 6 and defines the marker edges. The correct pattern determining section 11 extracts the pattern sandwiched by the marker edges defined by the marker edge defining section 10 and determines if it is good for a marker candidate pattern 104. If they are determined to be no good, it will not be used for a marker candidate pattern.

Now, referring to FIG. 9, an operation of detecting a marker candidate pattern 104 from a code having a predetermined white blanked area 107 between a marker 100 and a data pattern region 101A will be described.

Firstly, the imaging section 1 picks up an image of a code as shown in FIG. 9 and the image memory section 2 binarizes it into values of the binary system and stores black pixels as so many "1s" and white pixels as so many "0s". Then, the attribute determining section 3 selects a processing unit 102 of four horizontally adjacent pixels for determining the attribute as shown in FIG. 10. For instance, if all the four pixels are "1s" or the binary value expressed by the four digits is equal to hexadecimal "f", it determines the attribute to be the first attribute indicating the inside of the marker 100 whereas, if all the four pixels are "0s" or the binary value expressed by the four digits is equal to hexadecimal "0", it determines the attribute to be the second attribute indicating the predetermined white blanked area 107 neighboring the marker. If the binary value expressed by the four digits is other than hexadecimal "f" and "0", it determines the attribute to be the third attribute.

Then, the marker edge defining section 10 picks up a point where a set of predetermined number of consecutively arranged first attributes change to some other attribute on the basis of the attribute pattern 105 detected by the attribute pattern detecting section 6 and defines it as a marker edge. The correct pattern determining section 11 determines the pattern sandwiched by a pair of defined marker edges to be good if it contains a set of four to six consecutively arranged first attributes but not good if it contains a set of less than four or more than six consecutively arranged first attributes. Thus, it will be appreciated that the judgment of the correct pattern determining section 11 depends on the size of the markers used in the code to be read. FIG. 11 shows an example of marker candidate pattern 104 determined to be correct by the correct pattern determining section 11.

Thus, with this technique of determining if a pattern inserted between two opposite edges 108 is good as a marker candidate pattern 104 or not, this embodiment provides an advantage that, when the image shows a shading phenomenon due to a tilted or suspended imaging section 1 relative to the medium carrying a recorded code and/or a pattern resembling a marker 100 appears in the picked up image due to dust pieces on the recording medium, such a pseudo pattern would not be mistaken for a real pattern so that the embodiment would not detect wrong patterns resembling to the markers 100 in the picked up image and hence can reduce the risk of committing errors in reading data patterns 101 in addition to the above pointed out advantages of the present invention.

Figure 12:
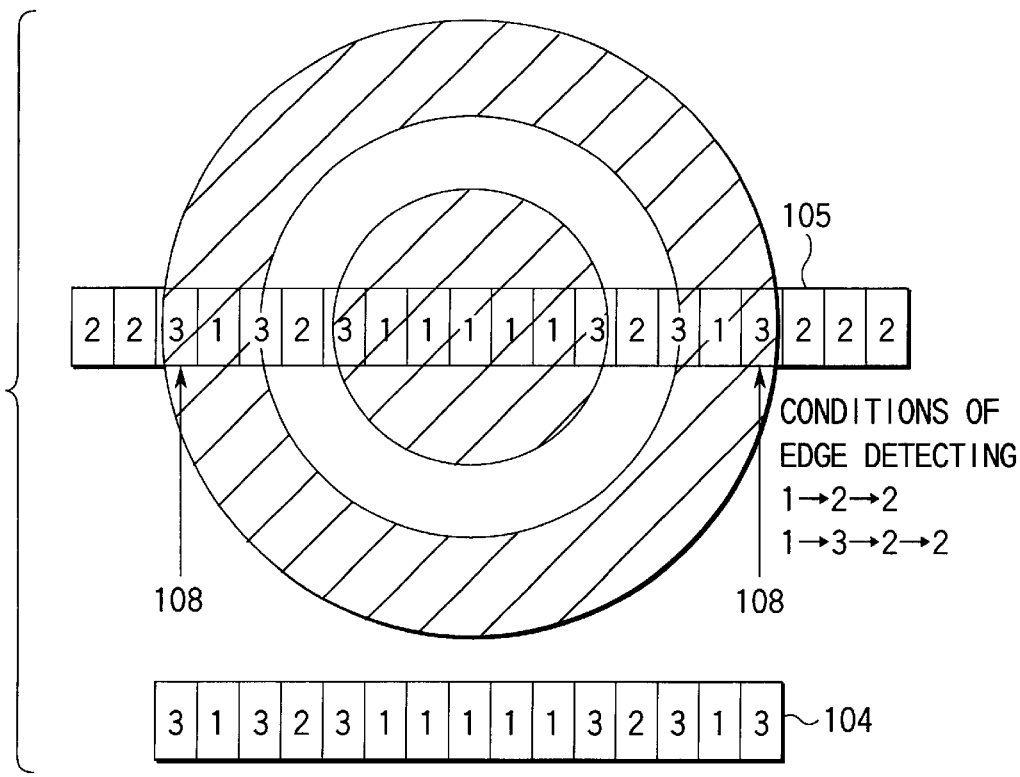
FIG. 12 is a schematic view of another marker showing a different configuration.
Figure 13:
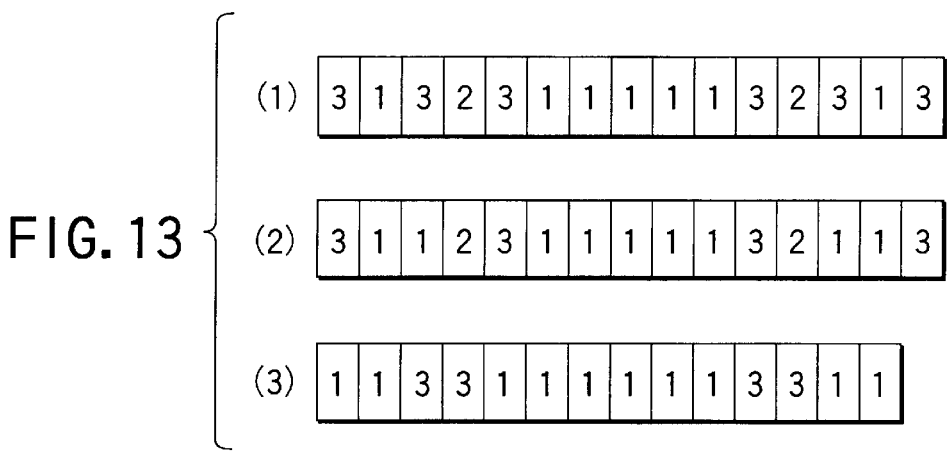
FIG. 13 is a schematic view of different formats of marker.

If a marker 100 shows a configuration as illustrated in FIG. 12, any of the patterns 1 through 3 of FIG. 13 should be detected depending on the positional relation of the marker 100 and the processing unit 102 for determining the attribute. Then, if the detected attribute pattern 105 is good for a marker candidate pattern 104 or not can be determined by determining if the attribute pattern 105 inserted between two opposite edges 108 selected for marker boundaries agrees with any of the patterns of FIG. 13.

Note that the marker edge defining section 10 can alternatively be so arranged that it defines a marker edge depending on the transitional pattern of attribute appearing after a set of a predetermined number of first attributes as shown in FIG. 14 on the basis of the attribute pattern 105 detected by the attribute pattern detecting section 6.

Now, an arrangement where the marker edge defining section 10 is made to define a first marker edge will be described as an example.

Figure 15:
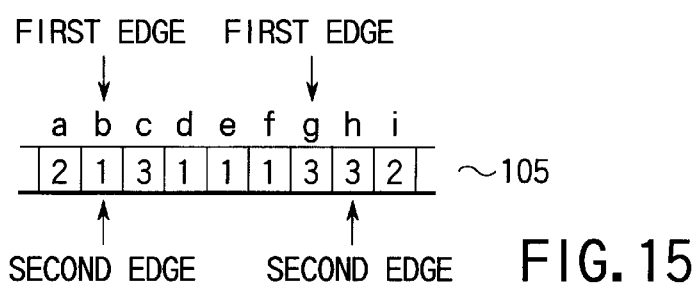
FIG. 15 is a schematic illustration of the operation of the marker edge defining section.

Referring to FIG. 15, assume that an edge is to be defined for the pattern of (3→3→2) appearing at the right side of a set of a predetermined number (≧3) of first attributes (d, e, f). Then, a first edge will be defined at g on the basis of the transitional pattern D of FIG. 14 for the transition (g, h) of 3→3. While a first edge may be defined at h on the basis of the transitional pattern C of FIG. 14 for the next transition (h, i) of 3→2, the edge g closer to the marker will be made effective. Now, assume that another edge is to be defined for a pattern of (3→1→2) appearing at the left side of the set of first attributes. Then, a first edge will not be defined on the basis of the transitional pattern B of FIG. 14 for the transition (c, b) of 3→1 but will be defined at b on the basis of the transitional pattern A of FIG. 14 for the transition (b, a) of 1→2.

Thus, in the example of FIG. 15, the left and right first edges are defined respectively at b and g.

Figure 16:
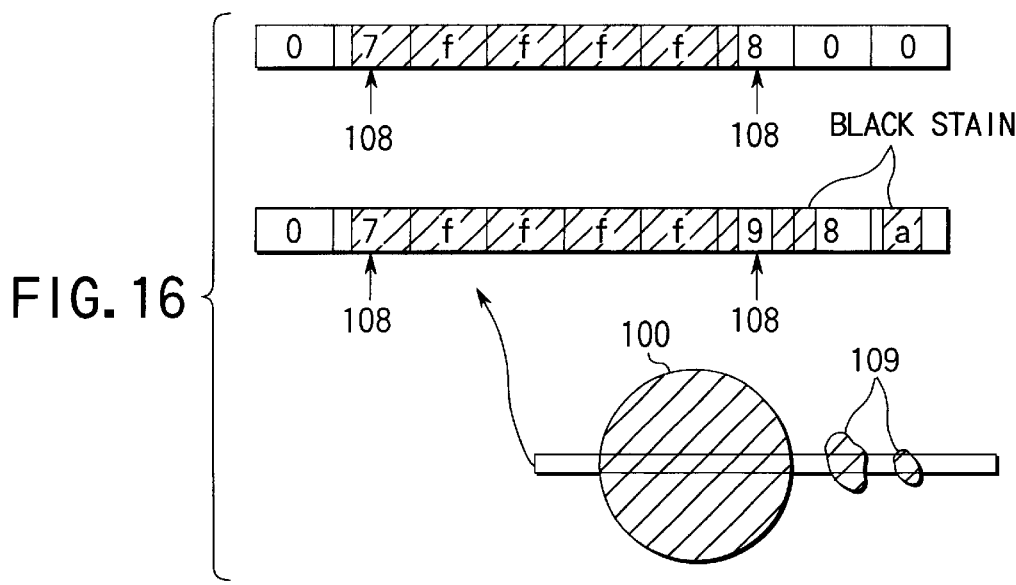
FIG. 16 is a schematic illustration of the operation of defining first marker edges.

By defining edges 108, when the image shows a shading phenomenon due to a tilted or suspended imaging section 1 or a pattern resembling a marker 100 appears in the picked up image due to dust pieces on the recording medium as shown in FIG. 16, the proper and correct marker edges 108 containing no stains can be detected to prevent detection of wrong regions as marker candidate patterns 104 and hence detection of wrong markers from occurring.

Additionally, if there is a transition of attribute such as 1→3→1, 3 would be taken for a white blanked area appearing in the marker and no first edge will be defined for it so that wrong edges 108 would not be detected even if a white blanked area is produced within the marker by a scar on the medium or by a rectangular reflection of light.

Now, an arrangement where the marker edge defining section 10 is made to define a second marker edge will be described as an example.

Referring to FIG. 15, a second edge will not be defined for the pattern of (3→3→2) appearing at the right side on the basis of the transitional pattern D of FIG. 14 for the transition (g, h) of 3→3 but will be defined at h on the basis of the transitional pattern C of FIG. 14 for the transition (h, i) of 3→2. Then, another second edge will not be defined for the pattern of (3→1→2) appearing at the left side on the basis of the transitional pattern B of FIG. 14 for the transition (c, b) of 3→1 but will be defined at b on the basis of the transitional pattern A of FIG. 14 for the transition (b, a) of 1→1.

Thus, in the example of FIG. 15, the left and right second edges are defined respectively at b and h.

Figure 17:
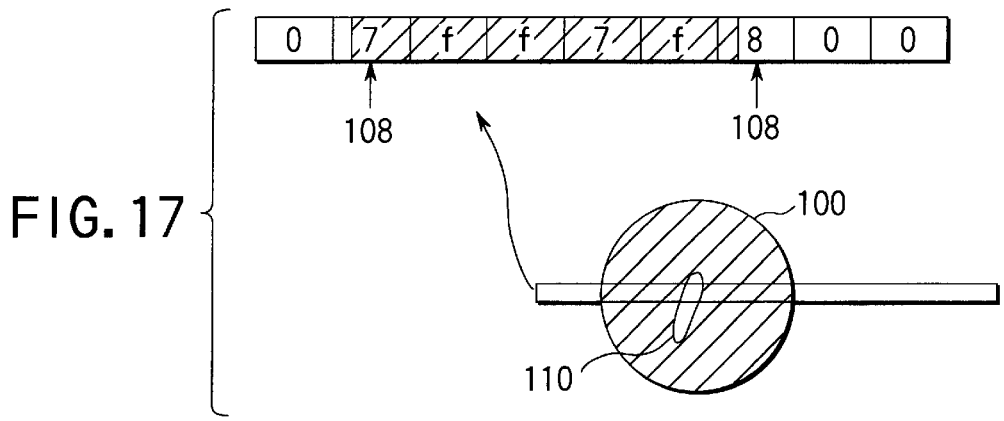
FIG. 17 is a schematic illustration of the operation of defining second marker edges.

Thus, with the above described arrangement for defining second edges 108, as shown in FIG. 17, wrong edges would not be detected even if a white blanked area is produced within the marker by a brilliant point produced at the time of imaging by a rectangular reflection of light or by a scar on the recording medium so that, as a result, only right marker edges 108 will be detected. In other words, if a marker contains a white blanked area 110 in it, the marker 100 can nevertheless be detected properly.

While not shown specifically, the marker edge defining section 10 may be so configured that it comprises a third marker edge defining section. The operation of such a marker edge defining section 10 will be described below by referring to FIGS. 9, 11 and 18.

Assume here that edges 108 are to be extracted from a code including a marker 100, data patterns 101 and a white blanked area 107 surrounding the marker 100 as shown in FIG. 9. Then, an ideal transition of the attribute pattern 105 surrounding the marker will be a pattern showing a transition from a first attribute indicating the inside of the marker to a second attribute indicating the outside of the marker or from a first attribute to a second attribute by way of a third attribute indicating coexistence of first and second attributes as shown in FIG. 11. On the other hand, any attribute pattern 105 surrounding the marker will not show such an ideal transitional pattern if it resembles the marker 100 and produced in the course of the imaging operation by a shading phenomenon and/or stains on the medium.

Figure 18:
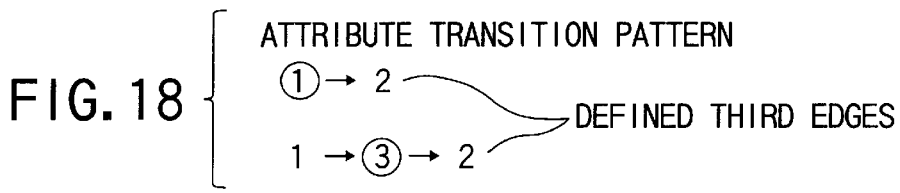
FIG. 18 is a schematic illustration of the operation of defining third marker edges.

Thus, only ideal marker edges can be detected by detecting a transitional pattern from a first attribute to a second attribute directly or by way of a third attribute as a characteristic trait of a marker edge and defining an edge on the basis of the characteristic trait as shown in FIG. 18. Then, any pseudo pattern resembling a marker 100 that may be produced by a shading phenomenon and/or stains on the medium can be successfully prevented from being erroneously detected as marker 100.

Additionally, when first and second edges are defined by means of the above described technique, the two edges will positionally agree with each other if there is not any black stain 109 due to a shading phenomenon at or near a marker edge or a stain on the medium nor any white blanked area 110 due to a scar on the medium or a brilliant point produced by a rectangular reflection, whereas they will positionally be differentiated from each other if there is a black stain 109 or a white blanked area 110 produced for some reason or other.

Thus, the positions of the first and second edges reflect the condition of the image at and near the marker so that any positional difference between the first and second edges can be used as information when the marker reliability determining section (as described in fourth embodiment) determines the reliability of a marker.

Although not specifically illustrated, the marker edge defining section 10 may additionally comprise a detailed edge defining section. The operation of a marker edge defining section 10 comprising a detailed edge defining section will be discussed below by referring to FIG. 19.

The attribute pattern detecting section 6 is adapted to detect a pattern where an attribute indicating the outside of a marker appears, the outside being located around a predetermined number of consecutive first attributes indicating the inside of the marker, and identifies it as an attribute pattern 105. Then, the detailed edge defining section pays attention to a processing unit 102 for determining the attribute that shows a characteristic trait of the marker edges of the detected attribute pattern 105 and detects a point where the value of the pixel 103 changes from "1" indicating the inside of the marker to "0" indicating the outside of the marker in the inside of the unit along a direction from the side indicating the attribute of the inside of the marker toward the side indicating the attribute of the outside of the marker on a pixel by pixel basis. Then, it defines a first edge 108-1 there. Or, it detects a point where the value of the pixel 103 changes from "0" indicating the outside of the marker to "1", indicating the inside of the marker along a direction from the side indicating the attribute of the outside of the marker toward the side indicating the attribute of the inside of the marker for the unit of a plurality of pixels to which it paid attention. Then, it defines a second edge 108-2 there.

After determining the attribute pattern on a unit of a plurality of pixels in a manner as described above, it then pays attention only to a part of the pattern showing a characteristic trait of a marker edge and defines an edge on a pixel by pixel basis so that consequently an edge 108 can be accurately and reliably detected at high speed if compared with a conventional technique of detecting an edge 108 from all the pixels 103 and can be detected with the accuracy of detecting a marker.

3rd Embodiment

Now, a third embodiment of the invention will be described below.

Figure 20:
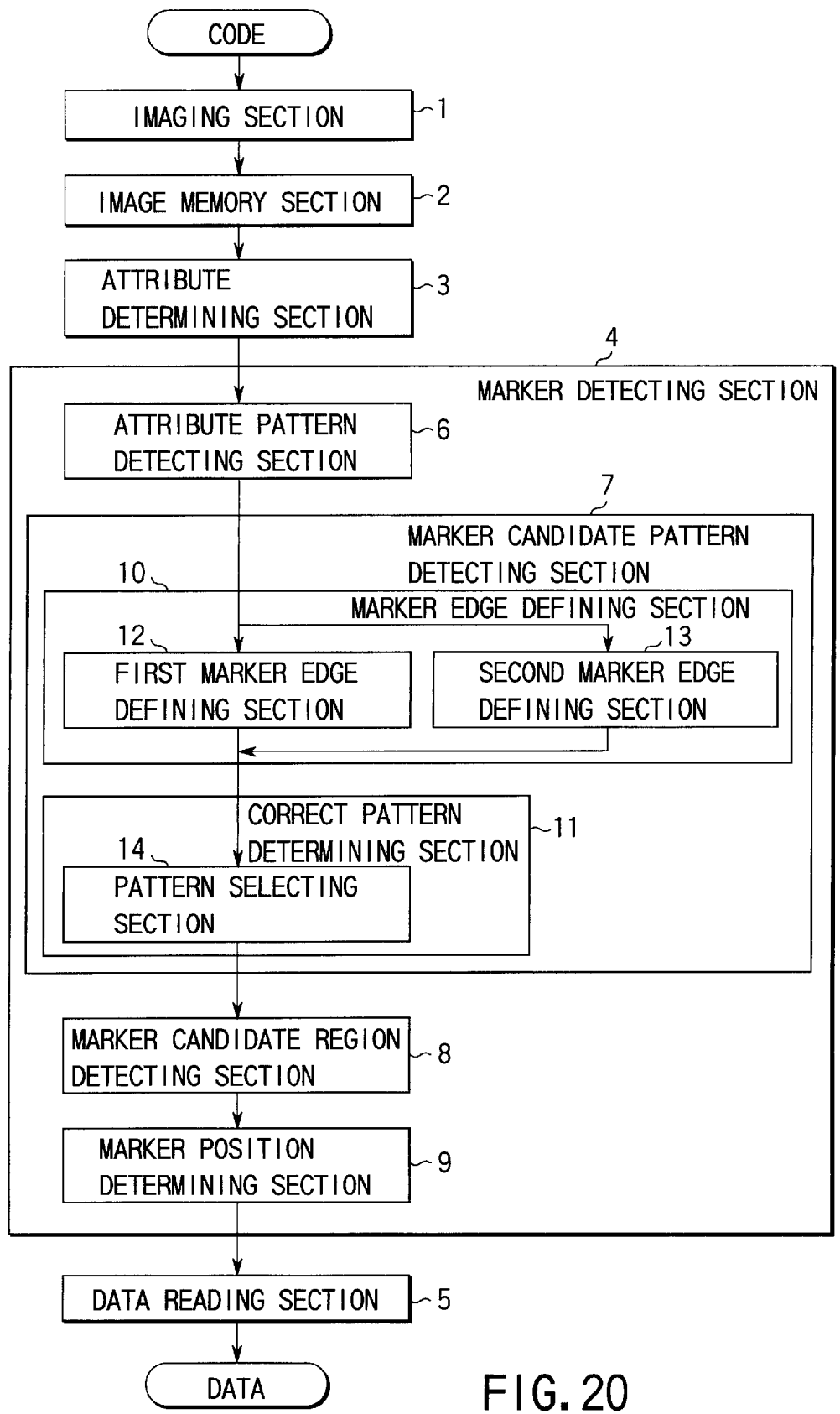
FIG. 20 is a schematic block diagram of a third embodiment of information reading system according to the invention.

Referring to FIG. 20, this embodiment of information reading system comprises an imaging section 1, an image memory section 2, an attribute determining section 3, a marker detecting section 4 and a data reading section 5 and the marker detecting section 4 includes an attribute pattern detecting section 6, a marker candidate pattern detecting section 7, a marker candidate region detecting section 8 and a marker position determining section 9 as in the case of the first embodiment. Additionally, the marker candidate pattern detecting section 7 includes a marker edge defining section 10 and a correct pattern determining section 11. Then, in this embodiment, the edge defining section 10 includes a first marker edge defining section 12 and a second marker edge defining section 13, whereas the correct pattern determining section 11 include a pattern selecting section 14.

This embodiment of information reading system is identical with the above described first embodiment except the marker candidate pattern detecting section 7 so that it will not be described further here.

Now, the operation of this embodiment will be discussed below.

The first marker edge defining section 12 and the second marker edge defining section 13 respectively defines first edges 108-1 and second edges 108-2 according to an edge defining rule as shown in FIG. 14 in a manner as described above by referring to the second embodiment.

Then, the pattern selecting section 14 extracts the pattern inserted between the edges 108-1 defined by the first marker edge defining section 12 and the pattern inserted between the edge 108-2 defined by the second marker edge defining section 13 and compares each of them with an ideal marker pattern. Then, it selects the one showing a characteristic trait closer to that of the ideal marker pattern as marker candidate pattern 104. The characteristic trait of a marker 100 may typically be the length, the area or the extent of matching of the pattern. If the length of the pattern is used as characteristic trait, the pattern selecting section 14 extracts the lengths of the two marker candidate patterns inserted respectively between the first edges 108-1 and the second edges 108-2 and compares them with the length of the ideal marker candidate pattern that may be provided in advance or read out from the code. Then, it selects the pattern showing a length closer to that of the ideal candidate pattern as proper marker candidate pattern 104.

Figure 21A:
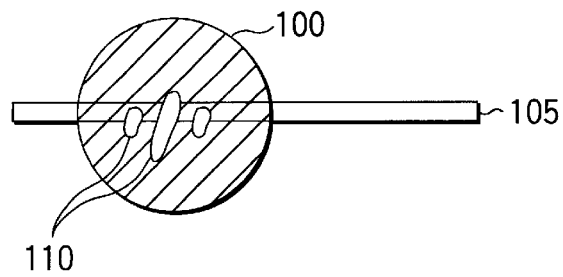
FIG. 21A is a schematic view of a marker containing white blanked areas therein.
Figure 21B:
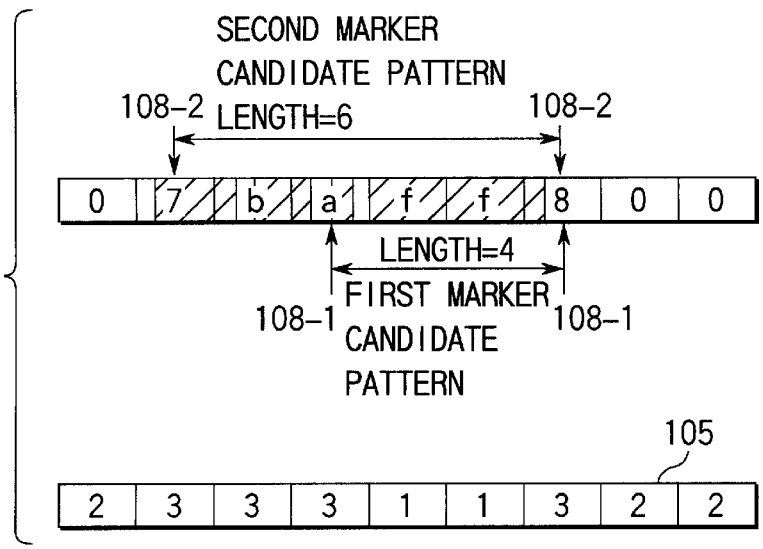
FIG. 21B is a schematic illustration of the operation of the first marker edge defining section and that of the second marker edge defining section for the marker of FIG. 21A.

If, for example, a marker contains white blanked areas 110 as shown in FIG. 21A, the first marker edge defining section 12 and the second marker edge defining section 13 respectively define first edges 108-1 and second edges 108-2 from the attribute pattern detected by the attribute pattern detecting section 6 and shown in FIG. 21B according to the edge defining rule as shown in FIG. 14. Then, the attribute selecting section 14 detects the lengths of the detected two marker candidate patterns. In this example, the length of the first marker candidate pattern inserted between the first edges 108-1 is 4 and that of the second marker candidate pattern inserted between the second edges 108-2 is 6. Then, these lengths are compared with the length (6 in this example) of the ideal marker candidate pattern provided in advance or read out from the code and the second marker candidate pattern is selected as proper marker candidate pattern 104 because its length is closer to that of the ideal marker candidate pattern.

Figure 22A:
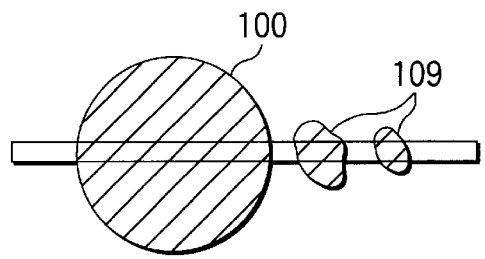
FIG. 22A is a schematic view of a marker containing black stains therein.
Figure 22B:
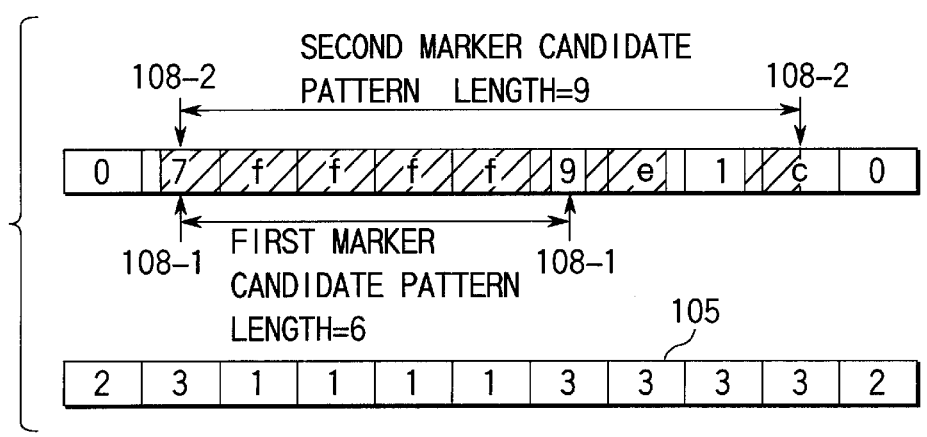
FIG. 22B is a schematic illustration of the operation of the first marker edge defining section and that of the second marker edge defining section for the marker of FIG. 22A.

If there are black stains near the marker 100 as shown in FIG. 22A, first edges 108-1 and second edges 108-2 are defined respectively by the first marker edge defining section 12 and the second marker edge defining section 13 as shown in FIG. 22B. Then, the length of the first marker candidate pattern inserted between the first edges 108-1 is 6 and that of the second marker candidate pattern inserted between the second edges 108-2 is 9. Thus, the pattern selecting section 14 selects the first marker candidate pattern as proper marker candidate pattern because its length is closer to the length of the ideal marker candidate pattern.

If the imaging condition and the condition of the code are stable and the marker 100 does not change its size, the ideal marker candidate pattern may be made to show a fixed length. If the size of the marker shot by the imaging section 1 can vary remarkably because of the magnification of the camera lens of the imaging section 1, the distance between the recording medium and the imaging section 1 or the size of the marker on the recording medium is variable, it may be so arranged that the pattern selecting section 14 does not compare the patterns until a marker is detected for the first time and stores the diameter of the marker 100 when it is detected. Then, the diameter will be compared with that of each marker candidate pattern detected thereafter and the pattern selecting section 14 will determine which marker candidate pattern is the proper marker candidate pattern.

Thus, with the above described embodiment, a plurality of patterns are detected and compared so that a pattern closer to the ideal pattern is selected as effective pattern. Then, if there are one or more than one white blanked areas 110 on or near the marker 100 due to a rectangular reflection or scars on the medium of if there are one or more than one black stains near the marker due to a shading phenomenon or stains on the medium, the influence of such white blanked areas 110 and black stains 109 can be minimized so that an effective marker candidate pattern 104 can be correctly detected.

4th Embodiment

Now, a fourth embodiment of the invention will be described below.

Figure 23:
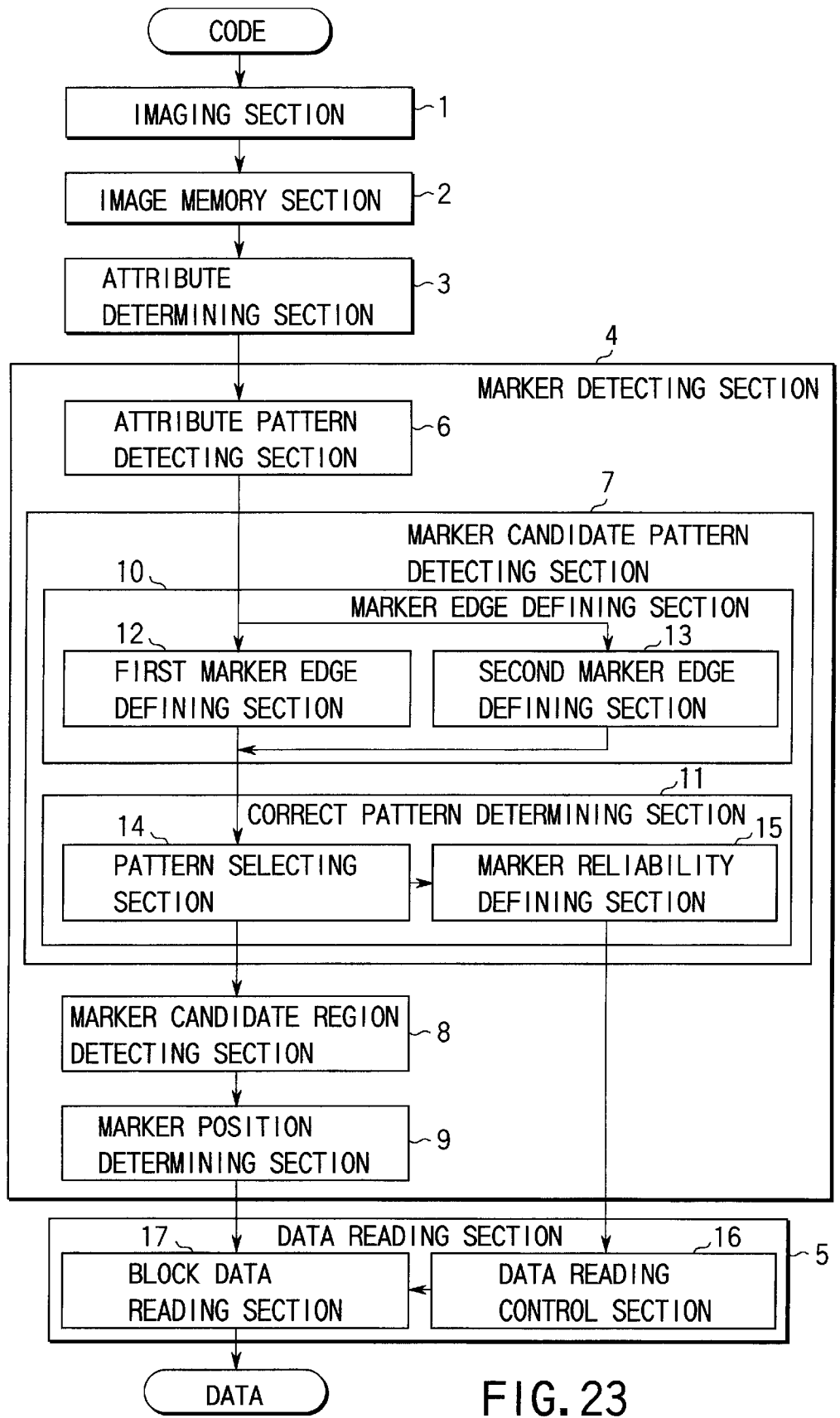
FIG. 23 is a schematic block diagram of a fourth embodiment of information reading system according to the invention.

FIG. 23 is a schematic block diagram of the fourth embodiment. Like the above described third embodiment, this embodiment comprises an imaging section 1, an image memory section 2, an attribute determining section 3, a marker detecting section 4 and a data reading section 5 and the marker detecting section 4 includes an attribute pattern detecting section 6, a marker candidate pattern detecting section 7, a marker candidate region detecting section 8 and a marker position determining section 9. The marker candidate pattern detecting section 7 includes a marker edge defining section 10 and a correct pattern determining section 11, of which the marker edge defining section 10 includes a first marker edge defining section 11 and a second marker edge defining section 12. Additionally, in this embodiment, the correct pattern determining section 11 includes a pattern selecting section 14 and a marker reliability defining section 15. Still additionally, in this embodiment, the data reading section 5 includes a data reading control section 16 and a block data reading section 17.

The configuration of this embodiment of information reading system is same as that of the above described first embodiment except the data reading section 5 and the marker candidate pattern detecting section 7 and hence will not be described here any further.

Now, the operation of this embodiment will be described by referring to FIGS. 24 through 27. Assume that a data to be recorded is divided into a plurality of blocks 111 and each block 111 is provided with four markers 100 arranged respectively at the four corners thereof as shown in FIG. 24.

Firstly, the marker reliability defining section 15 defines the marker reliability for each detected marker candidate pattern 104 on the basis of the difference between a predetermined ideal pattern formed from a known or picked up code and the detected pattern. For example, it may define the marker reliability as a value obtained by subtracting the absolute value of the difference between the length of the detected marker candidate pattern 104 and the diameter of the ideal marker 100 (the length of the ideal marker 112) from a predetermined value (10 in this example) as shown in FIG. 25.

FIG. 26 shows the reliability of each of the markers and the data of the n-th frame and those of the (n+α)-th frame appearing after the n-th frame. The block data reading section 17 reads out the data on the basis of the positions of the markers and stores the reliability of the data. It is assumed here that the reliability of the data is the average of the reliability of the four markers 100 arranged at the four corners of the block data.

Then, the data reading control section 16 compares the reliability of the read out data determined on the basis of the reliability of each of the markers 100 defined by the marker reliability defining section 15 and the reliability stored for the read out data. It would not read the data if the former is lower than the stored reliability, while it would read the data once again if the former is higher than the latter.

FIG. 27 shows the reliability of the data of the n-th frame and that of the data of the (n+α)-th frame. The reliability of the data pattern area C and that of the data pattern area D of the (n+α)-th frame are both 8 and hence higher than those of the n-th frame that are equal to 5. Thus, the data pattern areas C and D of the (n+α)-th frame will. be read once again and overwritten.

By expressing the reliability in a numerical value in this way, it may be so arranged that a data appearing with a higher reliability will be read for another time so that consequently a well imaged and reliable data may be selected and read.

5th Embodiment

Now, a fifth embodiment of the present invention will be described below.

Figure 28:
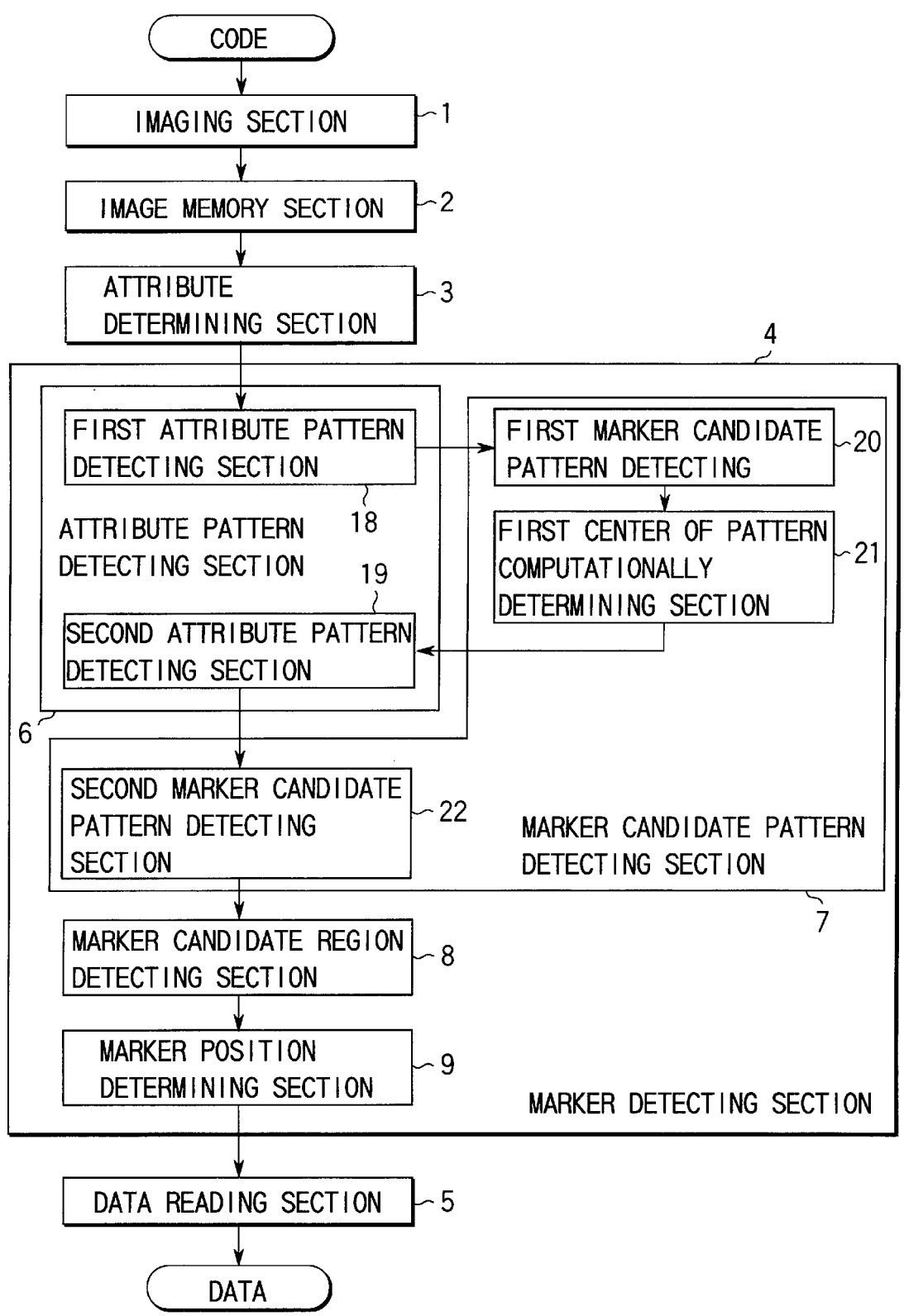
FIG. 28 is a schematic block diagram of a fifth embodiment of information reading system according to the invention.

FIG. 28 is a schematic block diagram of the fifth embodiment. Like the above described second embodiment, this embodiment comprises an imaging section 1, an image memory section 2, an attribute determining section 3, a marker detecting section 4 and a data reading section 5, of which the marker detecting section 4 includes an attribute pattern detecting section 6, a marker candidate pattern detecting section 7, a marker candidate region detecting section 8 and a marker position determining section 9. In this embodiment, the attribute pattern detecting section 6 includes a first attribute pattern detecting section 18 for detecting the pattern of appearance of consecutive attributes in a first direction and a second attribute pattern detecting section 19 for detecting the pattern of appearance of consecutive attributes in a second direction that is perpendicular to the first direction. Additionally, the marker candidate pattern detecting section 7 includes a first marker candidate pattern detecting section 20, a first center of pattern computing section 21 and a second marker candidate pattern detecting section 22. The first marker candidate pattern detecting section 20 detects a predetermined pattern having a characteristic trait of each of the markers 100 as first marker candidate pattern from the attribute pattern detected by the first attribute pattern detecting section 18 and the first center of pattern computing section 21 determines by computation the quasi-center of the first marker candidate pattern. The second marker candidate pattern detecting section 22 detects a predetermined pattern having the characteristic trait of each of the markers as second marker candidate pattern from the attribute pattern detected by the second attribute pattern detecting section 19 and including the quasi-center of the first marker candidate pattern.

Figure 29:
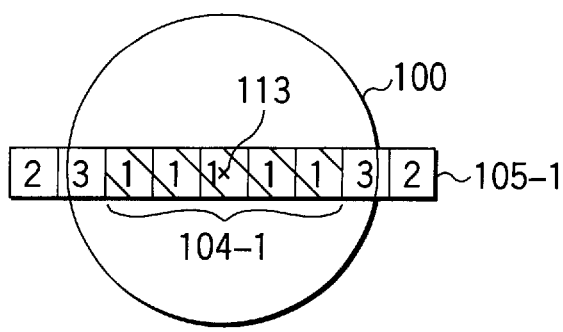
FIG. 29 is a schematic illustration of the operation of the first marker candidate pattern detecting section.

Now, the operation of this embodiment will be described by referring to FIGS. 29 through 31.

The first attribute pattern detecting section 18 horizontally scans the image stored in the image memory section 2 on the basis of a unit of a plurality of pixels to detect an attribute pattern. The first marker candidate pattern detecting section 20 detects a predetermined pattern showing a characteristic trait of each of the markers as first marker candidate pattern 104-1 from the first attribute pattern 105-1 detected by the first attribute pattern detecting section 18 as shown in FIG. 29. For example, the predetermined pattern may be a pattern containing first attributes indicating the inside of the marker and arranged consecutively by a predetermined number or more.

Subsequently, the first center of pattern computing section 21 determines by computation a quasi-center 113 of the first marker candidate pattern 104-1 that is located at the middle point of the right and left ends of the first marker candidate pattern 104-1.

Then, the second attribute pattern detecting section 19 detects an attribute pattern (second attribute pattern) vertically starting from the pattern including the quasi-center 113 computationally determined by the first center of pattern computing section 21.

Figure 30:
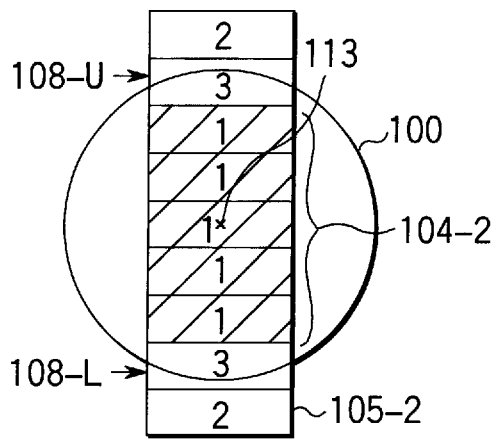
FIG. 30 is a schematic illustration of the operation of the second marker candidate pattern detecting section.

The second marker candidate pattern detecting section 22 firstly detects an attribute pattern upwardly starting from the pattern including the quasi-center 113 located above the second attribute pattern 105-2 detected by the second attribute pattern detecting section 19 and defines the first edge 108-1 according to the edge defining rule shown in FIG. 14, which will be designated as upper edge 108-U as shown in FIG. 30. Subsequently, it detects another attribute pattern downwardly starting from the pattern including the quasi-center 113 and defines the lower edge 108-L in a similar way. Thus, it detects the pattern inserted between the upper edge 108-U and the lower edge 108-L as second marker candidate pattern 104-2.

Then, the marker candidate region detecting section 8 detects a region with a height covering the second marker candidate pattern 104-2 and a width sufficiently covering the markers 100, the center being located at the quasi-center 113 of the first marker candidate pattern 104-1, as marker candidate region 106.

Subsequently, the marker position detecting section 9 determines a quasi-center of each of the markers from the detected marker candidate region 106, which may be the point of intersection of the diagonals of a circumscribed tetragon of the marker 100 or the centroid of the marker 100, and detects the position of the marker 100.

In this way, with this embodiment, the pattern of appearance of consecutively arranged attributes is detected in a first direction and then a marker candidate pattern 104 containing the quasi-center 113 is detected from the pattern of appearance of the attributes consecutively arranged in a second direction that is perpendicular to the first direction to detect a marker candidate region 106 on the basis of the position and the size of the marker candidate pattern 104. Thus, it is no longer necessary to determine the attribute of each of the imaged regions and hence a marker candidate region 106 can be detected accurately at high speed with a small number of times of access to the image memory section 2.

Figure 31:
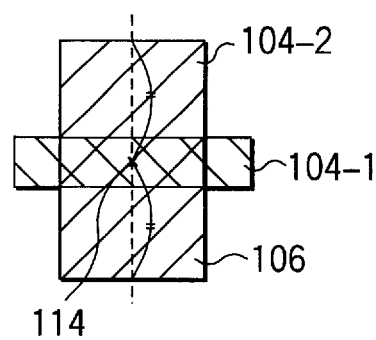
FIG. 31 is a schematic illustration of the operation of the marker candidate region detecting section.

Additionally, when a marker 100 is symmetrical of shape and may be circular, the marker candidate region 106 detected by the marker candidate region detecting section 8 does not need to contain the entire marker and may be a region obtained by simply laying a second marker candidate region that corresponds to the second marker candidate pattern 104-2 on a first marker candidate region that corresponds to the first marker candidate region 104-1 or vice versa as shown in FIG. 31. Then, if the horizontal quasi-center of the first marker candidate pattern is x and the vertical quasi-center of the second marker candidate pattern is y, the coordinate (x, y) will define the center of the marker relatively accurately. Thus, the marker position determining section 9 may only have to determine by computation the quasi-center 114 of the second marker candidate pattern 104-2 and detect the marker position because it can utilize the quasi-center 114 of the first marker candidate pattern 104-1 that has already been computationally determined. It will be appreciated that the quasi-center 114 of the second marker candidate pattern 104-2 can be computationally determined with ease by using the positions of the upper edge 108-U and the lower edge 108-L detected by the second marker candidate pattern detecting section 22.

Thus, the load of operation of the marker position determining section 9 can be reduced to improve the processing speed by approximately detecting the center of the marker 100 directly from the first marker candidate pattern 104-1 and the second marker candidate pattern 104-2.

Additionally, it may be so arranged that, upon detecting a predetermined number of attributes indicating the outside of the marker in the course of detecting a second marker candidate pattern 104-2, the second marker candidate pattern detecting section 22 rejects the first marker candidate pattern 104-1 detected by the first marker candidate pattern detecting section 20.

This operation of the embodiment will be discussed by referring to FIGS. 32A and 32B.

Figure 32A:
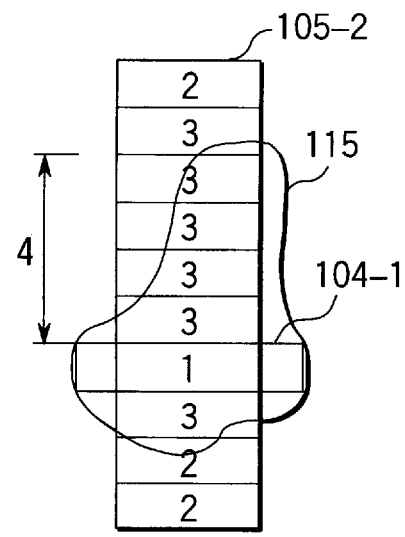
FIGS. 32A and 32B are schematic illustrations of the operations of the second marker candidate pattern detecting section when a predetermined number of different respective attribute patterns that are external to the marker are detected.
Figure 32B:
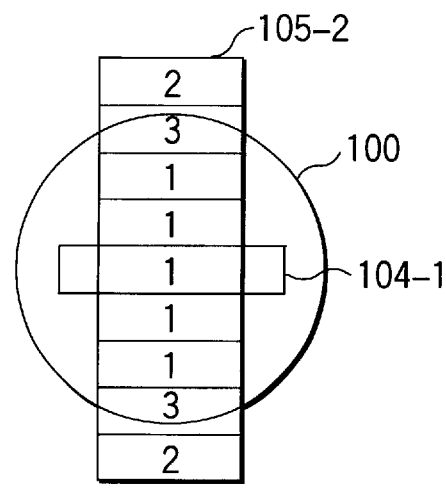

If the first marker candidate pattern detecting section 20 is adapted to detect a first marker candidate pattern 104-1 as a pattern containing a predetermined number of attributes indicating the inside of the marker and arranged consecutively, it can mistakenly detect a wrong pattern (wrong marker 115), if any, that is formed by stains on the medium and resembles the marker 100 as shown in FIG. 32A as first marker candidate pattern 104-1. Then, the first center of pattern computing section 21 computationally determines a quasi-center 113 of this first marker candidate pattern 104-1 and the second attribute pattern detecting section 19 detects vertically (upwardly and downwardly) a second attribute pattern 105-2 starting from the pattern containing the quasi-center 113. Note that, the pattern of upward appearance of attributes will be such that, if it is that of a marker, several third attributes will be found at and near the boundary of the marker 100 at most until a second attribute is detected as seen from FIG. 32B. To the contrary, however, the pattern of upward appearance of attributes will be such that, if it is not that of a marker, a multiplicity of third attributes will be detected consecutively as shown in FIG. 32A. Then, the second marker candidate pattern detecting section 22 determines that the marker candidate pattern that is currently being detected is produced by stains on the picked up image and not by a marker 100 when the number of consecutive attributes other than those indicating the inside of the marker is not less than four. It then rejects the first marker candidate pattern 104-1, suspending the detecting operation. Thereafter, the operation of the first attribute pattern detecting section 18 for detecting a first attribute pattern 105-1 will be resumed.

With this arrangement, if the first marker candidate pattern detecting section 20 erroneously detects a pattern that is not a true marker 100 as first marker candidate pattern 104-1, the error will be detected during the operation of the second marker candidate pattern detecting section 22 so that the operation of detecting the next marker 100 will be started. Thus, if a pattern produced by a shading phenomenon in the picked up image or by stains on the medium resembles a marker 100, inutile efforts of processing the false pattern will be eliminated and a true marker 100 will be detected at high speed.

6th Embodiment

Now, a sixth embodiment of the invention will be described below.

Figure 33:
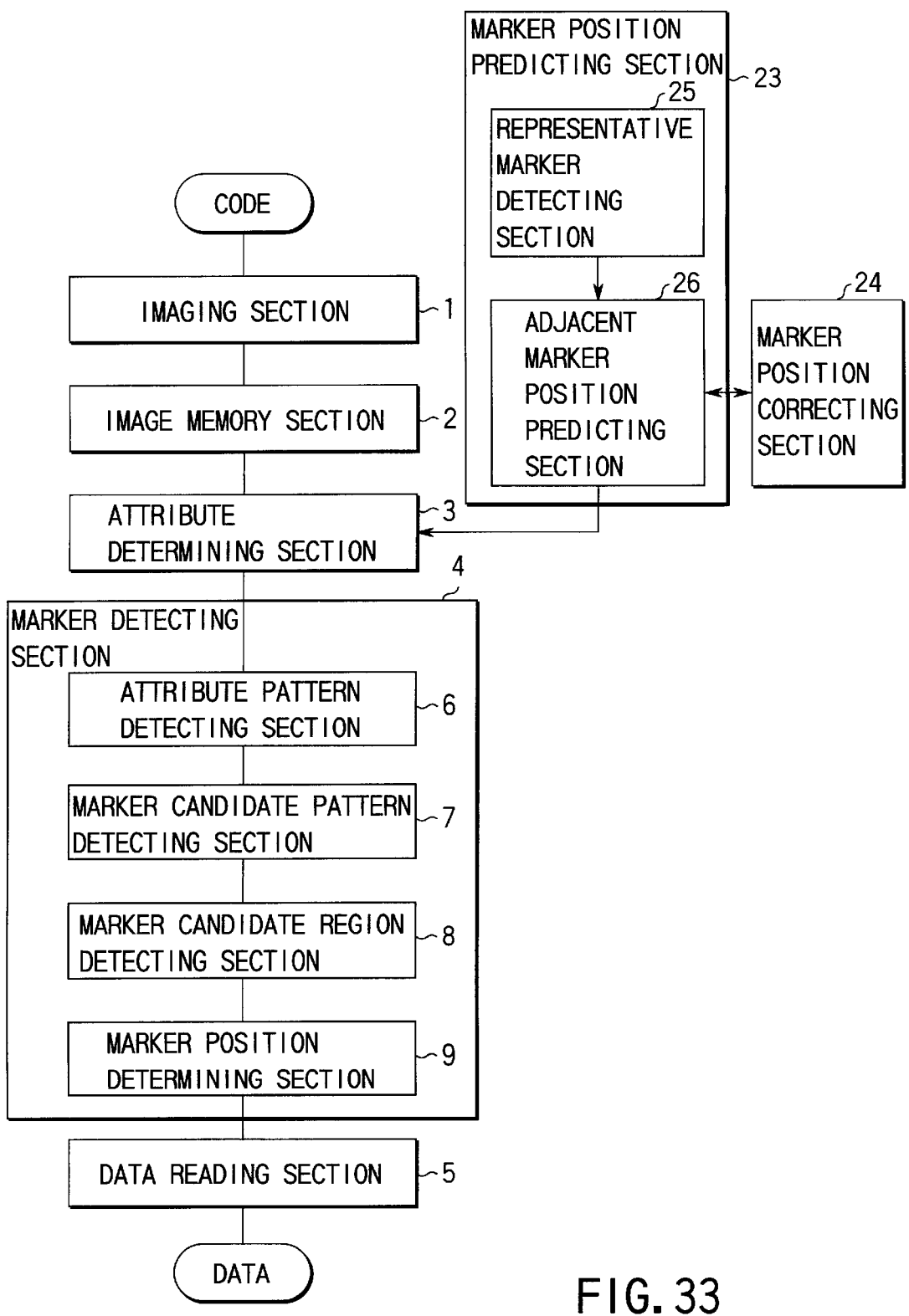
FIG. 33 is a schematic block diagram of a sixth embodiment of information reading system according to the invention.

FIG. 33 is a schematic block diagram of this embodiment of information reading system. Like the first embodiment, this embodiment comprises an imaging section 1, an image memory section 2, an attribute determining section 3, a marker detecting section 4 and a data reading section 5, of which the marker detecting section 4 includes an attribute pattern detecting section 6, a marker candidate pattern detecting section 7, a marker candidate region detecting section 8 and a marker position determining section 9. This embodiment of information reading system additionally comprises a marker position predicting section 23 and a marker position correcting section 24. The marker position predicting section 23 includes a representative marker detecting section 25 and an adjacent marker position predicting section 26.

Figure 34:
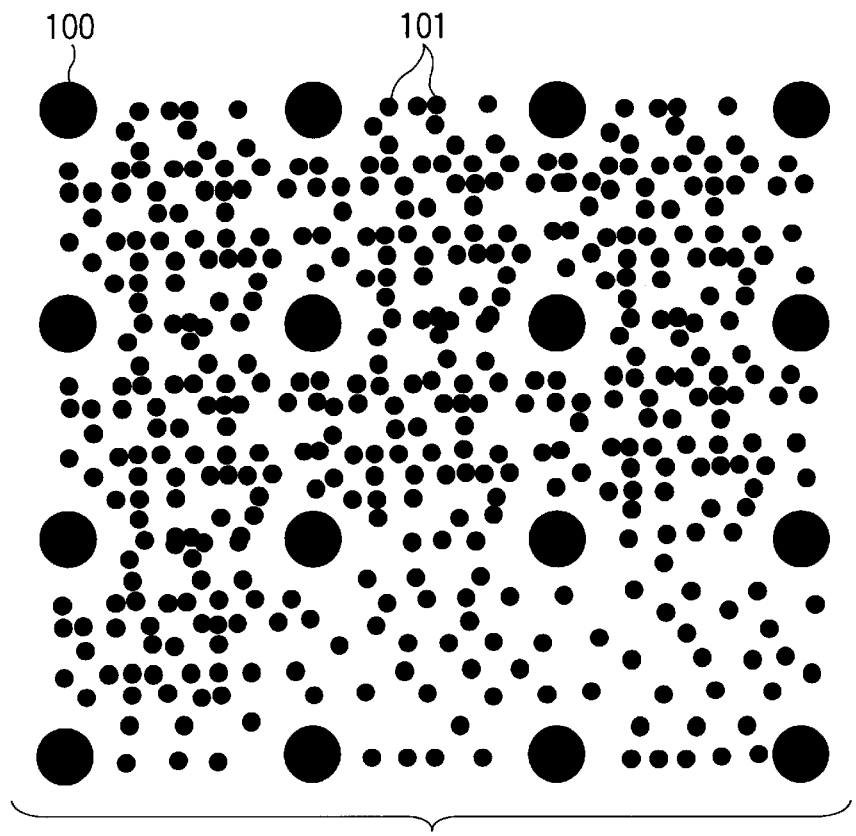
FIG. 34 is a schematic view of an optically readable code where markers are arranged regularly according to a predetermined format, to which the sixth embodiment of the invention is applicable.

Codes to which this embodiment of information reading system is applicable are optically readable codes realized by regularly and linearly arranging markers 100 according to a predetermined format as shown in FIG. 34.

Now, the operation of the marker detecting section 4 of this embodiment will be described by referring to FIG. 35.

The representative marker detecting 25 firstly detects marker "#1" 100-1 from the picked up image, using the technique described above by referring to the first through fourth embodiments. The outcome of the detecting operation of the representative marker detecting section 25 is applied to the adjacent marker position predicting section 26.

The adjacent marker position predicting section 26 computationally determines a predicted position for marker "#2" 100-2 from the position of marker "#1" 100-1 and a prediction vector 116. The prediction vector 116 may be provided in advance or detected from the read out code. If it is to be detected from the read out code, it may be so arranged that firstly two markers 100 are detected from a picked up image and then the prediction vector 116 may be determined with ease from their positional relationship. If a number of images are taken continuously, the positional relationship of the markers 100 detected in the immediately preceding image may be utilized.

The marker position predicting section 23 may be so arranged as to predict the position of a marker on the basis of the code imaging conditions and the information on the format. If, for instance, the relative positional relationship of the code and the imaging section 1 is known, the marker position can be predicted with easy on the basis of the information on the format of the code.

Then, the marker detecting section 4 ascertains that the predicted position is found within the marker and then detects marker "#2" 100-2. If, for instance, a representative marker is detected by the technique of the fourth embodiment, it will ascertain that the predicted position 117 is contained in the first attribute pattern 105-1 indicating the inside of the marker and proceed to the above operation.

Thus, the positions of other markers are predicted on the basis of the position and the size of the detected marker and the format of the code so that the marker detecting operation will be conducted only at and near the predicted positions 117. As a result, the area to be detected for markers is limited to reduce the time required for the detecting operation and hence the time required for the operation. Additionally, as the marker positions are predicted on the basis of the format of the code and the operation of detecting markers is limited to a predicted area, the risk of erroneously detecting wrong markers can significantly be reduced.

If the predicted position 117 of marker "#2" 100-2 as predicted by the marker position predicting section 23 is not contained within the first attribute pattern 105-1 because the medium itself is deformed and/or the imaging section 1 is tilted or suspended relative to the medium, the marker position predicting section 24 can correct the predicted marker position.

Then, the marker position. correcting section 24 firstly detects the direction along which marker "#2" 100-2 is actually displaced relative to the predicted position 117 of marker "#2" 100-2. It then corrects the predicted position in the detected direction of displacement.

Figure 35:
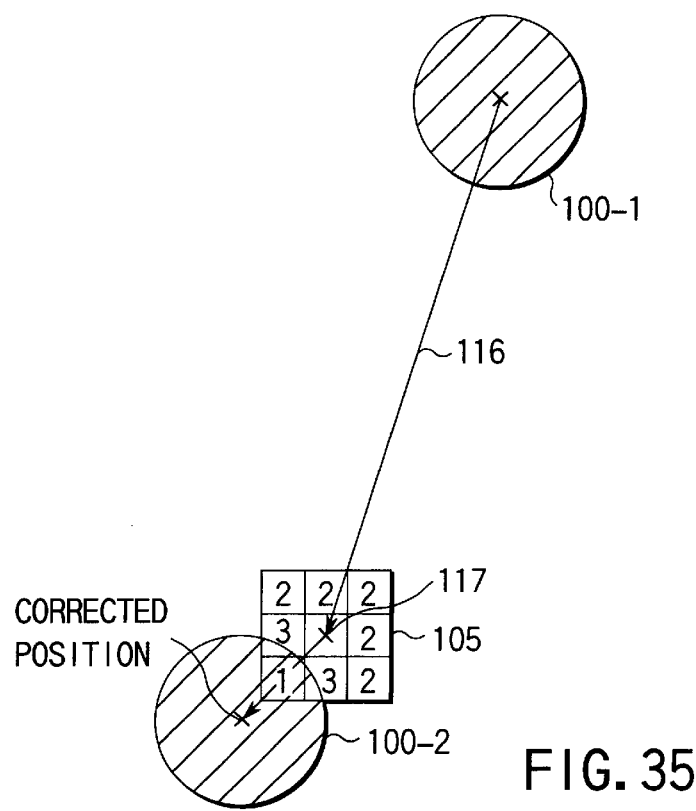
FIG. 35 is a schematic illustration of the operation of the marker detecting section of the sixth embodiment.

If, for instance, as shown in FIG. 35, the predicted position 117 of marker "#2" 100-2 is located outside the marker, the attribute pattern 105 will be detected within an allowable marker displacement range by referring to the predicted position 117. Then, the direction along which the pattern "1" indicating the inside of the marker is found (the lower left direction in FIG. 35) is detected as the direction of displacement of the marker 100 within a limited area around the predicted position 117 of the marker in order to correct the predicted position. The limit of the extent of correction is desirably the radius of the marker 100.

With this arrangement, if the position 117 predicted by the marker position predicting section 23 is found outside the actual marker 100, the marker position correcting section 24 corrects the predicted position so that the marker 100 can be detected correctly if its position is displaced because the medium itself is deformed and/or the imaging section 1 is tilted or suspended.

While the present invention is described above by way of embodiments, the present invention is by no means limited to the embodiments, which may be modified in many different ways within the scope of the invention.

The present invention can be summarized as follow.

(1) An information reading system adapted to optically read a code optically readably recorded on an information recording medium and including data patterns recorded according to a given piece of information and markers of a predetermined size arranged with predetermined positional relationships relative to the data patterns and provided for use in determining the position for reading each of the data patterns, the markers being optically identifiably recorded in a mode different from the mode of recording the data pattern, the information reading system comprising:

an imaging section for imaging the code from the information recording medium;

an image memory section for storing at least a partial region of the image picked up by the imaging section;

an attribute determining section for determining the attributes of a unit of a predetermined number of adjacently located pixels, the number of pixels being determined on the basis of the size of the markers, in order to discriminate the markers from the data patterns in the image stored in the image memory section;

a marker detecting section for detecting the markers on the basis of the attributes determined by the attribute determining section; and a data reading section for determining the positions for reading the data patterns on the basis of the positions of the markers detected by the marker detecting section and reading the data.

This arrangement corresponds to the first embodiment as illustrated in FIG. 1. A code includes data patterns recorded according to a given piece of information and markers arranged with predetermined positional relationships rela-tive to the data patterns and provided for use in determining the positions for reading the data patterns, the markers being optically identifiably recorded in a mode different from the mode of recording the data patterns (in terms of size, shape and color).

The image memory section corresponds to the image memory section 2 of the first embodiment and is adapted to store the image of the code optically picked up by the imaging section 1 of the first embodiment that corresponds to the above imaging section. The attribute determining section 3 of the first embodiment that corresponds to the above attribute determining section determines the attributes of the image stored in the image memory section 2 with a unit of a plurality of adjacently located pixels, the number of pixels being determined on the basis of the size of the markers and the marker detecting section 4 of the firs embodiment that corresponds to the above marker detecting section detects the markers on the basis of the attributes determined by the attribute determining section 3. Then, the data reading section 5 of the first embodiment that corresponds to the above data reading section determines the positions for reading the data patterns on the basis of the positions of the detected markers and actually reads the data.

Thus, the attributes are determined by a unit of a plurality of adjacently arranged pixels to reduce the number of times of determining the attributes and realize a high speed operation if compared with conventional techniques of determining the attributes on a pixel by pixel basis.

(2) An information reading system as defined in (1) above, wherein the image memory section binarizes a picked up image into values of a binary system and stores data of a pack of consecutive 8n (n=integer) pixels, and the attribute determining section determines the attributes by a unit of 8n pixels.

This arrangement also corresponds to the first embodiment as shown in FIG. 1.

The image memory section 2 of the first embodiment that corresponds to the above image memory section binarizes a picked up image into values of a binary system and stores image data of a pack of consecutive 8n pixels. The attribute determining section 3 that corresponds to the above attribute determining section determines the attributes by a unit of 8n pixels.

With the above described arrangement, the data width to be used for determining the attributes agree with the unit of data to be used for storing image data in the image memory section 2 so that the image memory section 2 can be accessed at high speed for determining the attributes to reduce the time required for the processing operation.

(3) An information reading system as defined in (1) above, wherein the markers are optically readably recorded with a size differentiated from the size of the data patterns, and the attribute determining section determines the attributes of a unit of a predetermined number of adjacently located pixels, the number being determined on the basis of the size of the markers and the size of the data patterns.

The above arrangement also corresponds to the first embodiment as shown in FIG. 1.

As shown in FIG. 4A, the markers and the data patterns contained in a code are optically readably recorded with different sizes and the attribute determining section 3 that corresponds to the above attribute determining section determines the attributes of a unit of a plurality of adjacently located pixels, the size of which is greater than a data pattern and smaller than a marker and provides a satisfactory resolution for seizing the characteristic trait of the markers.

Thus, the unit to be used for determining the attributes is determined appropriately on the basis of the size of the data patterns and that of the markers so that the markers can be detected at high speed from an image containing a mixture of a data patterns and markers having respective different sizes.

(4) An information reading system as defined in (1) above, wherein the marker detecting section includes:
an attribute pattern detecting section for detecting the pattern of appearance of the attributes as determined by the attribute determining section;
a marker candidate pattern detecting section for detecting a predetermined pattern showing a characteristic trait of a marker as marker candidate pattern from the attribute pattern detected by the attribute pattern detecting section;
a marker candidate region detecting section for detecting a region containing the marker candidate pattern detected by the marker candidate pattern detecting section as marker candidate region; and
a marker position determining section for determining the position of a marker from the marker candidate region detected by the marker candidate region detecting section.

This arrangement also corresponds to the first embodiment as illustrated in FIG. 1. Thus, the marker detecting section 4 that corresponds to the above marker detecting section includes a attribute pattern detecting section 6 that corresponds to the above attribute pattern detecting section, a marker candidate pattern detecting section 7 that corresponds to the above marker candidate pattern detecting section, a marker candidate region detecting section 8 that corresponds to the above marker candidate region detecting section and a marker position determining section 9 that corresponds to the above marker position determining section.

The attribute pattern detecting section 6 detects a pattern of the attributes of a unit of a predetermined number of adjacently located pixels as determined by the attribute determining section 3 and the marker candidate pattern detecting section 7 detects a pattern showing a characteristic trait of the markers as marker candidate pattern from the detected attribute patterns. The marker candidate region detecting section 8 detects a region that contains the detected marker candidate pattern and is sufficiently large to contain a marker as marker candidate region and the marker position determining section 9 determines the marker position from the detected marker candidate pattern typically by utilizing the quasi-center of the marker.

Thus, a marker detecting operation is conducted on a unit of a plurality of pixels to allow the marker detecting operation to proceed at high speed.

(5) An information reading system as defined in (4) above, wherein the attribute determining section determines a first attribute indicating the inside of a marker, and
the marker candidate pattern detecting section detects a pattern of a predetermined number of adjacently arranged first attributes as a marker candidate pattern.

This arrangement also corresponds to the first embodiment illustrated in FIG. 1. As the attribute pattern detecting section 6 that corresponds to the above attribute pattern detecting section detects a pattern of not less than a predetermined number (e.g. 3) of first attributes indicating the inside of a marker as shown in FIG. 5, the marker candidate pattern detecting section 7 of the embodiment that corresponds to the above marker candidate pattern detecting section takes up the pattern as marker candidate pattern.

With this arrangement, only a number of consecutive first attributes indicating the inside of a marker needs attention to be paid for the operation of the embodiment so that the operation of detecting markers is simplified and can be conducted at high speed.

(6) An information reading system as defined in (4) above, wherein the marker candidate pattern detecting section includes:
a marker edge defining section for detecting a predetermined pattern showing a characteristic trait of a marker edge from the attribute pattern detected by the attribute pattern detecting section and defining marker edges; and
a correct pattern determining section for extracting a pattern inserted between the edges defined by the marker edge defining section from the attribute pattern detected by the attribute pattern detecting section and determines if it is a correct marker candidate pattern or not.

This arrangement corresponds to the above described second embodiment as illustrated in FIG. 8. The marker edge defining section 10 of the second embodiment that corresponds to the above marker edge defining section detects a transitional pattern showing, for example, a transition of attribute from an attribute indicating the inside of a marker toward the outside of the marker from the attribute pattern detected by the attribute pattern detecting section 6 and defines an edge of the marker. Then, the correct pattern determining section 11 that corresponds to the above correct pattern determining section extracts a pattern inserted between a pair of edges defined by the marker edge defining section 10 and determines if the pattern is appropriate as marker candidate pattern or not. The length, the number of pixels or the pattern of appearance of edges of the extracted pattern may be used as reference for the determining operation.

With this arrangement, if a pattern resembling a marker appears as a result of a bad imaging condition caused by a tilted or suspended imaging section, a shading phenomenon of the image or the pieces of dust on the medium, the risk of detecting such a pattern as marker candidate pattern is reduced. Thus, the risk of mistakenly detecting a pattern resembling a marker and produced in the picked up image to give rise to a defective data pattern reading operation can be significantly reduced.

(7) An information reading system as defined in (6) above, wherein the attribute determining section determines the presence or absence of a first attribute indicating the inside of a marker, and
the correct pattern determining section determines if the extracted pattern is a pattern of a predetermined number of adjacently located first attributes or not.

This arrangement also corresponds to the second embodiment shown in FIG. 8. The correct pattern determining section 11 that corresponds to the above correct pattern determining section determines the pattern inserted between the marker edges defined by the marker edge defining section 10 as correct pattern if it contains a predetermined number of adjacently located first attributes but rejects it as incorrect pattern if it contains adjacently located first attributes by less than or more than a predetermined number.

With this arrangement of detecting an edge pattern to determine the correctness of a pattern inserted between a pair of edges, the risk of mistakenly detecting a wrong pattern resembling a marker and produced by pieces of dust on the medium can be minimized.

(8) An information reading system as defined in (6) above, wherein the attribute determining section determines the presence or absence of a first attribute indicating the inside of a marker, and the marker edge defining section includes a first edge defining section adapted to detect a transitional pattern of moving from the first attribute to another attribute as characteristic trait of a marker edge and define an edge there.

This arrangement also corresponds to the second embodiment as shown in FIG. 8 and the first edge defining section corresponds to the marker edge defining section 10 of the second embodiment.

The marker edge defining section 10 defines a first edge on the basis of the attribute pattern detected by the attribute pattern detecting section 6 according to the transitional pattern of attribute and the edge defining rule as shown in FIG. 14.

With this arrangement, a proper edge containing no stains can be detected correctly if a black stain appear near the imaged marker due to a shading phenomenon or a stain on the medium so that the risk of mistakenly detecting a false region as marker candidate pattern and consequently detecting wrong marker can be eliminated.

(9) An information reading system as defined in (6) above, wherein the attribute determining section determines the presence or absence of a second attribute indicating the outside of a marker in the vicinity of the marker, and the marker edge defining section includes a second edge defining section adapted to detect a transitional pattern of moving to the second attribute from another attribute as characteristic trait of a marker edge and define an edge there.

This arrangement also corresponds to the second embodiment as shown in FIG. 8 and the second edge defining section corresponds to the marker edge defining section 10 of the second embodiment.

The marker edge defining section 10 defines a second edge on the basis of the attribute pattern detected by the attribute pattern detecting section 6 according to the transitional pattern of attribute and the edge defining rule as shown in FIG. 14.

With this arrangement, a proper edge can be detected correctly if a white blanked area appear near the imaged marker due to a brilliant point produced by a rectangular reflection at the time of imaging or a scar on the medium so that the risk of mistakenly detecting a false region containing a white blanked area as marker candidate pattern and consequently detecting wrong marker can be eliminated.

(10) An information reading system as defined in (6) above, wherein the attribute determining section determines presence or absence of a first attribute indicating the inside of a marker, a second attribute indicating the outside of the marker in the vicinity thereof and a third attribute different from the first attribute and the second attribute, and the marker edge defining section includes a third edge defining section adapted to detect a transitional pattern moving from the first attribute to the second attribute or from the first attribute to the second attribute by way of the third attribute as characteristic trait of a marker edge and defines an edge there.

This arrangement also corresponds to the second embodiment as shown in FIG. 8. The marker edge defining section 10 that corresponds to the above third edge defining section defines an edge from the attribute pattern detected by the attribute pattern detecting section 6, paying attention to the attribute pattern that can be detected near an ideal marker edge. Thus, it defines a third edge according to the transitional pattern of attribute and the edge defining rule as shown in FIG. 18.

With this arrangement, only ideal marker edges will be detected so that the risk of mistakenly detecting a pattern produced by a shading phenomenon or a stain on the medium and resembling a marker can be eliminated.

(11) An information reading system as defined in (6) above, wherein the attribute determining section determines the presence or absence of a first attribute indicating the inside of a marker and also of a second attribute indicating the outside of the marker in the vicinity thereof, the marker edge defining section includes:

a first edge defining section for detecting a transitional pattern moving from the first attribute to another attribute as characteristic trait of a marker edge and defines an edge there; and a second edge defining section for detecting a transitional pattern moving to the second attribute from another attribute as characteristic trait of a marker edge and defines an edge there, and the correct pattern determining section includes a pattern selecting section adapted to compare the pattern inserted between the edges defined by the first edge defining section and the pattern inserted between the edges defined by the second edge defining section and select the proper pattern as marker candidate pattern.

This arrangement corresponds to the third embodiment as shown in FIG. 20. The first marker edge defining section 12 that corresponds to the above first edge defining section defines a first edge from the attribute pattern detected by the attribute pattern detecting section 6 according to the transitional pattern of attribute and the edge defining rule as shown in FIG. 14.

Similarly, the second marker edge defining section 13 that corresponds to the above second edge defining section defines a second edge according to the transitional pattern of attribute and the edge defining rule as shown in FIG. 14.

The pattern selecting section 14 that corresponds to the above pattern selecting section compares the pattern inserted between the first pair of edges with the pattern inserted between the second pair of edges and detects the pattern close to an ideal pattern as marker candidate pattern. For comparing with an ideal pattern, the length or the number of pixels of the pattern may be used as reference.

With this arrangement, the operation of detecting marker candidate pattern will not be affected by a white blanked area produced on the marker by a rectangular reflection or a scar on the medium or a black stain located near the marker and produced by a shading phenomenon or a stain on the medium so that only effective marker candidate patterns will be detected.

(12) An information reading system as defined in (6) above, wherein the correct pattern determining section includes a marker reliability determining section adapted to select a marker reliability level according to the difference between a predetermined ideal pattern that may be a known pattern or defined by an imaged code and the marker candidate pattern, and the data reading section includes a data reading control section for controlling the data reading operation to be conducted by referring to the marker positions according to the marker reliability level selected by the marker reliability selecting section.

This arrangement corresponds to the fourth embodiment as shown in FIG. 23. Thus, the marker reliability selecting section 15 of the correct pattern determining section 11 that corresponds to the above marker reliability selecting section of the correct pattern determining section computationally determines the marker reliability level on the basis of the difference of length between the detected marker candidate pattern and the ideal pattern. Then, the data reading section 5 that corresponds to the above data reading section selects the data reading reliability level as shown in FIG. 26 on the basis of the computationally determined marker reliability level and stores the read out data and the reliability level thereof with the correlation of them. When the data that has been read out is imaged for another time, the data reading control section 16 that corresponds to the above data reading control section compares the stored reliability and the reliability of the newly imaged data and, if the latter shows a higher reliability level, it so controls the operation as to read and store the latter.

With this arrangement, it is possible to read a data that is imaged better and hence more reliable.

(13) An information reading system as defined in (6) above, wherein the marker edge defining section includes a detailed edge defining section adapted to detects a predetermined pattern showing a characteristic trait of a marker edge from the attribute pattern detected by the attribute pattern detecting section and also an edge on a pixel by pixel basis within the detected pattern and defines an edge there.

Figure 19:
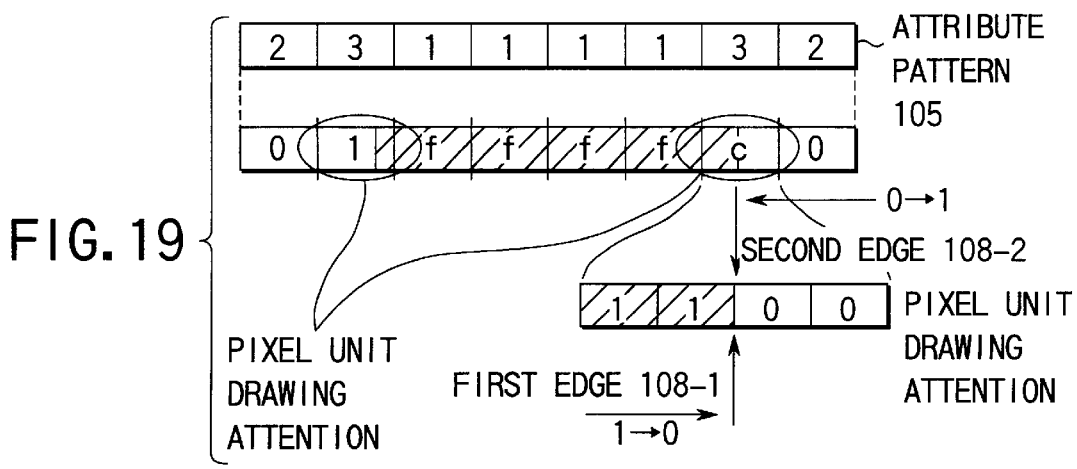
FIG. 19 is a schematic illustration of the operation of the detailed edge defining section.

This arrangement corresponds to the second embodiment as shown in FIG. 8. The detailed edge defining section of the marker edge defining section 10 that corresponds to the above detailed edge defining section of the marker edge defining section defines a detailed edge on a pixel by pixel basis as shown in FIG. 19 from the attribute pattern detected by the attribute pattern detecting section 6, paying attention to the plurality of pixels showing a characteristic trait of a marker edge. In other words, it defines an edge on a pixel by pixel basis, paying attention only to the part of the pattern showing a characteristic trait of a marker edge, after determining the attribute pattern on the basis of a plurality of pixels.

With this arrangement, an edge can be detected at high speed if compared with a case where an edge is detected from all the pixels, and is detected with a satisfactory level of accuracy of detecting a marker.

(14) An information reading system as defined in (4) above, wherein the attribute pattern detecting section includes:
a first attribute pattern detecting section for detecting a pattern of appearance of consecutive attributes arranged in a first direction; and
a second attribute pattern detecting section for detecting a pattern of appearance of consecutive attributes in a second direction perpendicular to the first direction, the marker candidate pattern detecting section includes:
a first marker candidate pattern detecting section for detecting a predetermined pattern showing a characteristic trait of a marker from the attribute pattern detected by the first attribute pattern detecting section as first marker candidate pattern;
a first center of pattern computationally determining section for determining a quasi-center of the first marker candidate pattern; and
a second marker candidate pattern detecting section for detecting a predetermined pattern showing a characteristic trait of a marker from the attribute pattern containing the quasi-center of the first marker candidate pattern and detected by the second attribute pattern detecting section, and the marker candidate detecting section being adapted to detect a predetermined region defined on the basis of the position and the size of the second marker candidate pattern detected by the marker candidate pattern detecting section as marker candidate region.

This arrangement corresponds to the fifth embodiment as shown in FIG. 28. Then, the first attribute pattern detecting section 18 that corresponds to the above first attribute pattern detecting section detects an attribute pattern in the first direction, while the second attribute pattern detecting section 19 that corresponds to the above second attribute pattern detecting section detects an attribute pattern in the second direction that is perpendicular to the first direction. The first marker candidate pattern detecting section 20 that corresponds to the above first marker candidate pattern detecting section detects a first marker candidate pattern from the attribute pattern detected by the first attribute pattern detecting section 18 and the first center of pattern computationally determining section 21 that corresponds to the above first center of pattern computationally determining section determines by computation a quasi-center of the first marker candidate pattern. Then, the second candidate pattern detecting section 22 that corresponds to the above second candidate pattern detecting section detects a second marker candidate pattern by referring to a pattern containing the quasi-center as shown in FIG. 30 and the marker candidate region detecting section 8 that corresponds to the above marker candidate region detecting section detects a marker candidate region on the basis of the outcome of the operation of detecting the first and second marker candidate patterns.

Thus, with this arrangement, a pattern showing an appearance of consecutive attributes in the first direction is firstly detected and then a marker candidate pattern is detected from a pattern including the quasi-center of the above pattern and showing an appearance of consecutive attributes in the second direction that is perpendicular to the first direction. Then, a marker candidate region is detected on the basis of the position and the size of the marker candidate pattern.

With this arrangement, it is not necessary to determine the attributes of all the imaged regions for detecting a marker candidate region so that a marker candidate region can be detected accurately at high speed with a reduced number of accesses to the image memory.

(15) An information reading system as defined in (14) above, wherein the second marker candidate pattern detecting section further includes a reject section adapted to reject the first marker candidate pattern detected by the first marker candidate pattern detecting section upon detecting a predetermined number of attribute patterns indicating the outside of a marker while detecting a second marker candidate pattern.

This arrangement corresponds to the fifth embodiment as shown in FIG. 28. Thus, the second candidate pattern detecting section 22 includes a reject section and, as the second candidate pattern detecting section 22 detects a predetermined number of third attributes that are different from the attribute indicating the inside of a marker as shown in FIG. 32A, it determines them as part of a false marker and the reject section suspends the operation of the second marker candidate pattern detecting section 22 and rejects the firs marker candidate pattern. Then, it resumes the operation of the first attribute pattern detecting section.

With this arrangement, if the first marker candidate pattern detecting section detects a false marker pattern as marker candidate pattern, the error will be detected in the course of operation of the second marker candidate pattern detecting section and the operation of detecting the next marker can be started immediately. Thus, if a pattern resembling a marker is made to appear by a shading phenomenon in the picked up image or a stain on the medium, the operation of abortively processing the false pattern can be minimized so that the operation of detecting a proper marker can be conducted at high speed.

(16) An information reading system as defined in (4) above, wherein
- the markers are arranged according to a format,
- the marker detecting section further including a marker position predicting section adapted to predict a marker position in the image picked up by the imaging section from the information known in advance or obtained from the imaged code, and
- the marker candidate pattern detecting section detects a predetermined pattern having a characteristic trait of a marker from the attribute pattern containing the marker position predicted by the marker position predicting section and detected by the attribute pattern detecting section as marker candidate pattern.

This arrangement corresponds to the sixth embodiment as shown in FIG. 33. The code is an optically readable code typically realized by arranging a plurality of blocks as shown in FIG. 34. The marker position predicting section 23 predicts the marker position on the basis of the code imaging condition or the code format information and the marker detecting section 4 detects a marker only at and near the predicted position.

With this arrangement, the area to be detected for a marker is limited to reduce the time required for the detecting operation so that the operation can be conducted at high speed. Additionally, since the marker position is predicted on the basis of the format of the code and the marker detecting operation is conducted only in the area predicted to be containing a marker, the risk of detecting a false marker can be further reduced.

(17) An information reading system as defined in (16) above, wherein
- the marker position predicting section includes a marker position correcting section adapted to correct the predicted marker position in advance to the operation of detecting the marker candidate pattern if the attribute of the predicted marker position indicate the outside of a marker in an area near the marker.

This arrangement corresponds to the sixth embodiment as shown in FIG. 33. Thus, if the attribute of the position predicted by the marker position predicting section 23 indicates the outside of the marker, the marker position correcting section 24 that corresponds to the above marker position correcting section firstly detects the direction of displacement of the actual marker relative to the predicted marker position as predicted by the marker position predicting section 23 and then corrects the predicted position to the detected direction of displacement.

With this arrangement, if the marker position is displaced due to a deformed medium, a tilted or suspended imaging section or a deformed code image, the marker can nevertheless be detected correctly.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reading system adapted to optically read a code optically readably recorded on an information recording medium and including data patterns recorded according to a given piece of information and markers of a predetermined size arranged with predetermined positional relationships relative to the data patterns and provided for use in determining the position for reading each of the data patterns,
   said markers being optically identifiably recorded in a mode different from the mode of recording said data pattern,
   said information reading system comprising:
      an imaging section for imaging said code from said information recording medium;
      an image memory section for storing at least a partial region of said image picked up by said imaging section;
      an attribute determining section for determining the attributes of a unit of a predetermined number of adjacently located pixels, the number of pixels being determined on the basis of the size of said markers, in order to discriminate said markers from said data patterns in the image stored in said image memory section;
      a marker detecting section for detecting said markers on the basis of the attributes determined by said attribute determining section; and
      a data reading section for determining the positions for reading said data patterns on the basis of the positions of the markers detected by said marker detecting section and reading the data.

2. The information reading system according to claim 1, wherein
   said image memory section binarizes a picked up image into values of a binary system and stores data of a pack of consecutive 8n (n=integer) pixels, and
   said attribute determining section determines the attributes by a unit of 8n pixels.

3. The information reading system according to claim 1, wherein
   said markers are optically readably recorded with a size differentiated from the size of said data patterns, and
   said attribute determining section determines the attributes of a unit of a predetermined number of adjacently located pixels, the number being determined on the basis of the size of said markers and the size of said data patterns.

4. The information reading system according to claim 1, wherein
   said marker detecting section includes:
      an attribute pattern detecting section for detecting the pattern of appearance of the attributes as determined by said attribute determining section;

a marker candidate pattern detecting section for detecting a predetermined pattern showing a characteristic trait of a marker as marker candidate pattern from the attribute pattern detected by said attribute pattern detecting section;

a marker candidate region detecting section for detecting a region containing the marker candidate pattern detected by said marker candidate pattern detecting section as marker candidate region; and a marker position determining section for determining the position of a marker from the marker candidate region detected by said marker candidate region detecting section.

5. The information reading system according to claim 4, wherein said attribute determining section determines a first attribute indicating the inside of a marker, and said marker candidate pattern detecting section detects a pattern of a predetermined number of adjacently arranged first attributes as a marker candidate pattern.

6. The information reading system according to claim 4, wherein said marker candidate pattern detecting section includes:

a marker edge defining section for detecting a predetermined pattern showing a characteristic trait of a marker edge from the attribute pattern detected by said attribute pattern detecting section and defining marker edges; and a correct pattern determining section for extracting a pattern inserted between the edges defined by said marker edge defining section from the attribute pattern detected by said attribute pattern detecting section and determines if it is a correct marker candidate pattern or not.

7. The information reading system according to claim 6, wherein said attribute determining section determines the presence or absence of a first attribute indicating the inside of a marker, and said correct pattern determining section determines if the extracted pattern is a pattern of a predetermined number of adjacently located first attributes or not.

8. The information reading system according to claim 6, wherein said attribute determining section determines the presence or absence of a first attribute indicating the inside of a marker, and said marker edge defining section includes a first edge defining section adapted to detect a transitional pattern of moving from the. first attribute to another attribute as characteristic trait of a marker edge and define an edge there.

9. The information reading system according to claim 6, wherein said attribute determining section determines the presence or absence of a second attribute indicating the outside of a marker in the vicinity of the marker, and said marker edge defining section includes a second edge defining section adapted to detect a transitional pattern of moving to the second attribute from another attribute as characteristic trait of a marker edge and define an edge there.

10. The information reading system according to claim 6, wherein said attribute determining section determines presence or absence of a first attribute indicating the inside of a marker, a second attribute indicating the outside of the marker in the vicinity thereof and a third attribute different from the first attribute and the second attribute, and said marker edge defining section includes a third edge defining section adapted to detect a transitional pattern moving from the first attribute to the second attribute or from the first attribute to the second attribute by way of the third attribute as characteristic trait of a marker edge and defines an edge there.

11. The information reading system according to claim 6, wherein said attribute determining section determines the presence or absence of a first attribute indicating the inside of a marker and also of a second attribute indicating the outside of the marker in the vicinity thereof, said marker edge defining section includes:

a first edge defining section for detecting a transitional pattern moving from the first attribute to another attribute as characteristic trait of a marker edge and defines an edge there; and a second edge defining section for detecting a transitional pattern moving to the second attribute from another attribute as characteristic trait of a marker edge and defines an edge there, and said correct pattern determining section includes a pattern selecting section adapted to compare the pattern inserted between the edges defined by said first edge defining section and the pattern inserted between the edges defined by said second edge defining section and select the proper pattern as marker candidate pattern.

12. The information reading system according to claim 6, wherein said correct pattern determining section includes a marker reliability determining section adapted to select a marker reliability level according to the difference between a predetermined ideal pattern that may be a known pattern or defined by an imaged code and the marker candidate pattern, and said data reading section includes a data reading control section for controlling the data reading operation to be conducted by referring to the marker positions according to the marker reliability level selected by said marker reliability selecting section.

13. The information reading system according to claim 6, wherein said marker edge defining section includes a detailed edge defining section adapted to detects a predetermined pattern showing a characteristic trait of a marker edge from the attribute pattern detected by said attribute pattern detecting section and also an edge on a pixel by pixel basis within the detected pattern and defines an edge there.

14. The information reading system according to claim 4, wherein said attribute pattern detecting section includes:

a first attribute pattern detecting section for detecting a pattern of appearance of consecutive attributes arranged in a first direction; and a second attribute pattern detecting section for detecting a pattern of appearance of consecutive attributes in a second direction perpendicular to said first direction, said marker candidate pattern detecting section includes:

a first marker candidate pattern detecting section for detecting a predetermined pattern showing a characteristic trait of a marker from the attribute pattern detected by said first attribute pattern detecting section as first marker candidate pattern;

a first center of pattern computationally determining section for determining a quasi-center of said first marker candidate pattern; and a second marker candidate pattern detecting section for detecting a predetermined pattern showing a characteristic trait of a marker from the attribute pattern containing the quasi-center of said first marker candidate pattern and detected by said second attribute pattern detecting section, and said marker candidate detecting section being adapted to detect a predetermined region defined on the basis of the position and the size of the second marker candidate pattern detected by said marker candidate pattern detecting section as marker candidate region.

15. The information reading system according to claim 14, wherein said second marker candidate pattern detecting section further includes a reject section adapted to reject the first marker candidate pattern detected by said first marker candidate pattern detecting section upon detecting a predetermined number of attribute patterns indicating the outside of a marker while detecting a second marker candidate pattern.

16. The information reading system according to claim 4, wherein said markers are arranged according to a format, said marker detecting section further including a marker position predicting section adapted to predict a marker position in the image picked up by said imaging section from the information known in advance or obtained from the imaged code, and said marker candidate,pattern detecting section detects a predetermined pattern having a characteristic trait of a marker from the attribute pattern containing the marker position predicted by said marker position predicting section and detected by said attribute pattern detecting section as marker candidate pattern.

17. The information reading system according to claim 16, wherein said marker position predicting section includes a marker position correcting section adapted to correct the predicted marker position in advance to the operation of detecting said marker candidate pattern if the attribute of the predicted marker position indicate the outside of a marker in an area near the marker.

* * * * *